(12) United States Patent
Nishiwaki et al.

(10) Patent No.: US 7,692,875 B2
(45) Date of Patent: Apr. 6, 2010

(54) OPTICAL PICKUP AND OPTICAL DISK DEVICE HAVING THIS PICKUP

(75) Inventors: Seiji Nishiwaki, Hyogo (JP); Kazuo Momoo, Osaka (JP)

(73) Assignee: Panasonic Corporation, Kadoma (JP)

( * ) Notice: Subject to any disclaimer, the term of this patent is extended or adjusted under 35 U.S.C. 154(b) by 375 days.

(21) Appl. No.: 11/813,900

(22) PCT Filed: Jan. 19, 2006

(86) PCT No.: PCT/JP2006/300718

§ 371 (c)(1),
(2), (4) Date: Jul. 13, 2007

(87) PCT Pub. No.: WO2006/077915

PCT Pub. Date: Jul. 27, 2006

(65) Prior Publication Data

US 2009/0009886 A1 Jan. 8, 2009

(30) Foreign Application Priority Data

Jan. 20, 2005 (JP) .............................. 2005-012291

(51) Int. Cl.
*G02B 13/18* (2006.01)
*G02B 5/18* (2006.01)
(52) U.S. Cl. ...................... 359/719; 359/571
(58) Field of Classification Search ......... 359/718–719, 359/565, 566, 571
See application file for complete search history.

(56) References Cited

U.S. PATENT DOCUMENTS 6,449,095 B1 * 9/2002 Ohtaki et al. ............... 359/566

(Continued)

FOREIGN PATENT DOCUMENTS

EP 1 500 956 1/2005

(Continued)

OTHER PUBLICATIONS

International Search Report for corresponding Application No. PCT/JP2006/300718 mailed Feb. 21, 2006.

(Continued)

*Primary Examiner*—Scott J Sugarman
(74) *Attorney, Agent, or Firm*—Renner, Otto, Boisselle & Sklar, LLP

(57) ABSTRACT

An optical pickup according to the present invention includes a plurality of light sources for emitting a plurality of light beams including first and second light beams of respectively different wavelengths, an objective lens for converging the plurality of light beams, and a grating structure shaped axisymmetrically with respect to the optical axis of the objective lens. $P^{th}$-order diffracted light (where p is a non-zero integer) which is formed from the first light beam (e.g. blue) by the grating structure is converged on an information layer of an optical disk (e.g. a BD) corresponding to the first light beam, owing to the converging actions of the objective lens and grating structure. Moreover, $q^{th}$-order diffracted light (where q is a non-zero integer such that q≠p) which is formed from the second light beam (e.g. red or infrared) by the grating structure is converged on an information layer of an optical disk (e.g. a DVD or CD) corresponding to the second light beam, owing to the converging actions of the objective lens and the grating structure. Thus, by appropriately using diffracted light of different orders, it becomes possible to perform convergence on optical disks of different wavelengths and base thicknesses, with reduced spherical aberration.

15 Claims, 14 Drawing Sheets

U.S. PATENT DOCUMENTS

| | | | |
|---|---|---|---|
| 2004/0047269 A1 | 3/2004 | Ikenaka et al. | |
| 2004/0109242 A1 | 6/2004 | Komma et al. | |
| 2004/0257960 A1* | 12/2004 | Fujii | 369/112.05 |

FOREIGN PATENT DOCUMENTS

| | | |
|---|---|---|
| JP | 2001-093179 | 4/2001 |
| JP | 2004-192783 | 7/2004 |
| JP | 2004-247025 | 9/2004 |
| WO | 2003/091764 | 6/2003 |

OTHER PUBLICATIONS

Nikkei Electronics; Sep. 27, 2004 issue; pp. 101-121 (cited in [0021], p. 12 of the description).

Co-pending U.S. Appl. No. 11/575,595 filed on Mar. 20, 2007 (application provided).

Form PCT/ISA/237and a Concise Explanation.

* cited by examiner (a)    (b)

OPTICAL PICKUP AND OPTICAL DISK DEVICE HAVING THIS PICKUP

TECHNICAL FIELD

The present invention relates to an optical pickup and an optical disk apparatus having the pickup.

BACKGROUND ART

Data which is recorded on an optical disk is reproduced by irradiating the rotating optical disk with a light beam having a relatively weak constant light amount, and detecting reflected light which has been modulated by the optical disk.

On a read-only optical disk, information in the form of pits is recorded in a spiral manner, previously during manufacture of the optical disk. On the other hand, in the case of a rewritable optical disk, a method such as vapor deposition is used to deposit a film of recording material which allows for optical data recording/reproduction, on the surface of a base on which a track having spiral land or groove is formed. In the case where data is to be recorded on a rewritable optical disk, the optical disk is irradiated with a light beam whose light amount is modulated in accordance with the data to be recorded, thus causing local changes in the characteristics of the recording material film, whereby a data write is effected.

Note that the depth of the pits, the depth of the track, and the thickness of the recording material film are small relative to the thickness of the base of the optical disk. Therefore, any portion of the optical disk where data is recorded constitutes a two-dimensional surface, and may be referred to as a "signal surface" or an "information surface". In the present specification, since such a signal surface (information surface) has a physical size along the depth direction, the term "information layer" will be employed, instead of "signal surface (information surface)". An optical disk includes at least one such information layer. Note that one information layer may actually include a plurality of layers, e.g., a phase-change material layer and a reflective layer.

When reproducing data which is recorded on an optical disk, or recording data onto a recordable optical disk, it is necessary for a light beam to always retain a predetermined convergence state on a target track on the information layer. This requires "focus control" and "tracking control". "Focus control" refers to controlling the position of an objective lens along a normal direction of the information surface (hereinafter may be referred to as the "depth direction of the substrate") so that a focal point of the light beam (convergence point) is always positioned on the information layer. On the other hand, tracking control refers to controlling the position of an objective lens along a radial direction of the optical disk (hereinafter referred to as the "disk radial direction") so that a spot of the light beam is positioned on a predetermined track.

As conventional high-density/large-capacity optical disks, optical disks such as DVD (Digital Versatile Disc)-ROMs, DVD-RAMs, DVD-RWs, DVD-Rs, DVD+RWs, and DVD+Rs have been put to practical use. In addition, CDs (Compact Discs) are still in use. Currently, next-generation optical disks which have a higher density and a larger capacity than those of the above optical disks are being developed and put to practical applications, e.g., Blu-ray Discs (BDs).

Such optical disks have various structures depending on their types. For example, they may differ in terms of the physical structure of tracks, track pitch, depth of the information layer (distance from the light-incident surface to the information layer of the optical disk), etc. In order to properly read data from or write data to a plurality of types of optical disks with such different physical structures, it is necessary to employ optical systems having numerical apertures (NA) which are in accordance with the types of optical disks, so as to irradiate the information layer of each optical disk with laser light of an appropriate wavelength.

FIG. 1 is a perspective view schematically showing the optical disk 200. For reference's sake, FIG. 1 shows an objective lens (converging lens) 220 and laser light 222 which has been converged by the objective lens 220. The laser light 222 is radiated onto the information layer via the light-incident face of the optical disk 200, thus forming a light beam spot on the information layer.

FIGS. 2(a), (b), and (c) schematically show general cross sections of a CD, a DVD, and a BD, respectively. Each optical disk shown in FIG. 2 has a surface (light-incident surface) 200a and a rear face (label face) 200b, and at least one information layer 214 therebetween. On the rear face 200b of the optical disk, a label layer 218 which contains a title and a printout of graphics is provided. Each optical disk has an overall thickness of 1.2 mm, with a diameter of 12 cm. For simplicity, protrusion/depression structures such as pits or grooves are not illustrated in the figures, and reflective layers and the like are also omitted from illustration.

As shown in FIG. 2(a), the information layer 214 of a CD is positioned at a depth of about 1.2 mm from the surface 200a. In order to read data from the information layer 214 of a CD, it is necessary to converge near-infrared laser (wavelength: 785 nm), which is controlled so as to have a focal point positioned on the information layer 214. The numerical aperture (NA) of an objective lens which is used for converging the laser light is about 0.5.

As shown in FIG. 2(b), the information layer 214 of a DVD is positioned at a depth of about 0.6 mm from the surface 200a. In an actual DVD, two substrates having a thickness of about 0.6 mm are attached together via an adhesion layer. In the case of an optical disk having two information layers 214, the distances from the surface 200a to the information layers 214 are about 0.57 mm and about 0.63 mm, i.e., they are close. Therefore, regardless of the number of information layers 214, only one information layer 214 is described illustrated in the figure. In order to read data from or write data to the information layer 214 of a DVD, it is necessary to converge red laser (wavelength: 660 nm), which is controlled so as to have a focal point positioned on the information layer 214. The numerical aperture (NA) of an objective lens which is used for converging the laser light is about 0.6.

As shown in FIG. 2(c), a BD includes a thin cover layer (transparent layer) having a thickness 100 μm which is provided on the side of the surface 200a, and the information layer 214 is positioned at a depth of about 0.1 mm from the surface 200a. In order to data from the information layer 214 of a BD, it is necessary to converge blue-violet laser (wavelength: 405 nm), which is controlled so as to have a focal point positioned on the information layer 214. The numerical aperture (NA) of an objective lens which is used for converging the laser light is 0.85.

FIG. 3(a) is a schematic diagram showing spherical aberration being caused by the objective lens 220 when entered by parallel light. FIG. 3(b) is a schematic diagram showing how the spherical aberration is corrected by allowing divergent light to enter the same objective lens 220.

The magnitude of such a spherical aberration also changes depending on the thickness of a portion existing from the surface of the optical disk to the information layer (which may also be referred to as "base thickness"), that is, "depth of the information layer". FIG. 4 shows a light beam which has entered the optical disk 200 being converged on the information layer 214. Since the rays which compose the light beam are refracted at the surface of the optical disk 200, the convergence state of the light beam will vary in accordance with the refractive index and thickness of the portion existing from the surface of the optical disk 200 to the information layer 214. Therefore, even in the case where no spherical aberration occurs for a specific optical disk, spherical aberration may occur for an optical disk having a different base thickness.

As mentioned above, optical disks with various structures are available on the market, and there is desired an ability to support such a plurality of types of optical disks with a single apparatus. Such an optical disk apparatus will need to have a construction in which a light beam is selected as appropriate from among a plurality of light beams of different wavelengths, and irradiates an optical disk with a reduced spherical aberration.

Next, with reference to FIG. 20, a conventional example of an optical disk apparatus supporting a plurality of types of optical disks is described. For simplicity, FIG. 20 only illustrates the construction on the forward path side (i.e., starting from a light source and heading toward the disk surface), and the construction on the return path side (i.e., starting from the disk surface and heading toward a photodetector) is not illustrated.

The optical disk apparatus of FIG. 20 includes three light sources 1B, 1R, and 1I. Blue light (e.g., wavelength: 0.405 μm) which is emitted from the light source 1B, such as a blue-light emitting semiconductor laser, is reflected by a dichroic mirror prism 2 (which reflects blue light and transmits wavelengths longer than blue), and travels through a collimating lens 3 so as to be converted into plane waves 4B (a so-called infinite system). The plane waves 4B receive aperture restriction by a color-selective aperture filter 5 so as to have a numerical aperture corresponding to NA 0.85, and thereafter is transmitted through an objective lens 6 (e.g., NA 0.85 or more) to enter an optical disk. The light having entered an optical disk base 7B, having a thickness of 0.1 mm, is converged on an information layer 8B which is formed on the rear face of the base 7B. For simplicity, FIG. 20 simultaneously illustrates different optical disk bases 7B, 7R, and 7I and information layers 8B, 8R, and 8I, corresponding to the three light sources 1B, 1R, and 1I. In actuality, however, one optical disk that corresponds to one of the light sources is to be mounted in the optical disk apparatus.

On the other hand, red light (e.g., wavelength: 0.660 μm) which is emitted from the light source 1R, such as a red-light emitting semiconductor laser, is transmitted through a dichroic mirror prism 9 (which reflects infrared light and transmits wavelengths shorter than infrared light) and the dichroic mirror prism 2, and travels through the collimating lens 3 so as to be converted into divergent spherical waves 4R (a so-called finite system). The spherical waves 4R receive aperture restriction by the color-selective aperture filter 5 so as to have a numerical aperture corresponding to NA 0.6, and thereafter is transmitted through the objective lens 6 to enter an optical disk. The light having entered the optical disk base 7R, having a thickness of 0.6 mm, is converged on the information layer 8R which is formed on the rear face of the base 7R.

Furthermore, infrared light (e.g., wavelength: 0.790 μm) which is emitted from the light source 1I, such as an infrared-light emitting semiconductor laser, is reflected by the dichroic mirror prism 9 and transmitted through the dichroic mirror prism 2, and thereafter travels through the collimating lens 3 so as to be converted into divergent spherical waves 4I (a so-called finite system). The spherical waves 4I receive aperture restriction by the color-selective aperture filter 5 so as to have a numerical aperture corresponding to NA 0.5, and thereafter travels through the objective lens 6 to enter an optical disk. The light having entered the optical disk base 7I, having a thickness of 1.2 mm, is converged on the information layer 8I which is formed on the rear face of the base 7I.

The objective lens 6 is designed so that, with respect to the optical disk base 7B having a thickness of 0.1 mm, the light entering an infinite system at the wavelength of 0.405 μm will be converged with no aberration. Therefore, if light enters the infinite system at the wavelength of 0.660 μm or the wavelength of 0.790 μm with respect to the optical disk base 7R having a thickness of 0.6 mm or the optical disk base 7I having a thickness of 1.2 mm, respectively, a large spherical aberration will occur. The occurrence of spherical aberration is ascribable not only to differences in base thicknesses, but also refractive index dispersion in the objective lens, and spherical aberration in the disk base.

In the conventional example of FIG. 20, by bringing the positions of the light sources 1R and 1I closer to the collimating lens 3 along an optical axis L, the light having been transmitted through the collimating lens 3 is allowed to turn into divergent spherical waves 4R and 4I. By thus allowing the light sources 1R and 1I to function as light sources of a finite system, the aforementioned spherical aberration is cancelled.

[Non-Patent Document 1] Nikkei Electronics (Sep. 27, 2004 issue) P101-121

DISCLOSURE OF INVENTION

Problems to be Solved by the Invention

A conventional optical disk apparatus having the above construction has the following problems.

When light entering the objective lens 6 constitutes a finite system, coma aberration occurs in the light converged on the disk information layer due to displacements of the objective lens that are associated with tracking control, thus deteriorating the signal reproduction performance and recording performance.

Moreover, since the optical distance between the collimating lens 3 and each light source is different, it is not applicable to light sources in which a plurality of light sources are formed on the same substrate, e.g., two-wavelengths lasers or three-wavelengths lasers. This makes it difficult to simplify the optical system. Moreover, the dichroic mirror prisms 2 and 9 and the color-selective aperture filter 5 which are used in the above-described optical disk apparatus are expensive optical components which require highly precise multi-layer film formation techniques.

Furthermore, there is a problem in that spherical aberration cannot be absorbed by merely changing the optical distance between the collimating lens 3 and each light source. Specifically, the $3^{rd}$-order spherical aberration can be absorbed, but spherical aberration of the fifth and above orders will remain profusely. Therefore, depending on the design, one of aberration correction parts 10B, 10R, and 10I such as diffractive lenses may need to be interposed between each light source and the collimating lens 3, thus further increasing the cost of the optical system.

The present invention was made in view of such problems, and aims to provide an optical disk apparatus which, with respect to three types of optical disks having different base thicknesses, suppresses occurrence of spherical aberration with a simple construction and yet reduces the number of optical components.

Means for Solving the Problems

An optical pickup according to the present invention comprises: a plurality of light sources for emitting a plurality of light beams including first and second light beams of respectively different wavelengths; an objective lens for converging the plurality of light beams; and a grating structure shaped axisymmetrically with respect to an optical axis of the objective lens, wherein, the objective lens and the grating structure cause $p^{th}$-order diffracted light (where p is a non-zero integer) to be converged on an information layer of an optical disk corresponding to the first light beam, the $p^{th}$-order diffracted light (where p is a non-zero integer) being formed from the first light beam by the grating structure; and the objective lens and the grating structure cause $q^{th}$-order diffracted light (where q is a non-zero integer such that $q \neq p$) to be converged on an information layer of an optical disk corresponding to the second light beam, the $q^{th}$-order diffracted light being formed from the second light beam by the grating structure.

In a preferred embodiment, the first light beam has a blue wavelength and the second light beam has a red or infrared wavelength; and p=3 and q=2.

In a preferred embodiment, the plurality of beams include a third light beam of a wavelength which is different from the wavelengths of the first and second light beams; and the objective lens and the grating structure cause $r^{th}$-order diffracted light (where r is a non-zero integer such that $r \neq p$) to be converged on an information layer of an optical disk corresponding to the third light beam, the $r^{th}$-order diffracted light being formed from the third light beam by the grating structure.

In a preferred embodiment, the first, second, and third light beams have blue, red, and infrared wavelengths, respectively, where p=3 and q=r=2.

In a preferred embodiment, optical disks corresponding to the first, second, and third light beam are a BD, a DVD, and a CD, respectively.

In a preferred embodiment, the grating structure is formed on a surface of the objective lens.

In a preferred embodiment, the grating structure is formed on a parallel-surface plate.

In a preferred embodiment, the objective lens is formed of an optical material having an Abbe number of 30 or less.

In a preferred embodiment, the grating structure has a sawtooth blazed surface.

In a preferred embodiment, the grating structure includes: a first light transmitting layer having a first sawtooth blazed surface, the first sawtooth blazed surface including a plurality of first light-transmitting slopes defining a first blaze angle; and a second light transmitting layer having a second sawtooth blazed surface, the second sawtooth blazed surface including a plurality of second light-transmitting slopes defining a second blaze angle, the second light transmitting layer being in contact with the first sawtooth blazed surface of the first light transmitting layer, and a tilting direction of the first light-transmitting slopes and a tilting direction of the second light-transmitting slopes are opposite.

In a preferred embodiment, one of the first light transmitting layer and the second light transmitting layer is composed of the objective lens; and the other of the first light transmitting layer and the second light transmitting layer is formed on the objective lens.

In a preferred embodiment, a refractive index and a dispersion of one of the first light transmitting layer and the second light transmitting layer are higher than a refractive index and a dispersion of the other; and the objective lens is composed of a light transmitting layer whose refractive index and dispersion are higher between the first light transmitting layer and second light transmitting layer.

In a preferred embodiment, a deviation of a focal length of the objective lens for an optical disk corresponding to each of the plurality of light sources is 1/50 or less of an average focal length.

In a preferred embodiment, a second grating structure is further comprised, wherein, the second grating structure form $p'^{th}$-order diffracted light, $q'^{th}$-order diffracted light, and $r'^{th}$-order diffracted light (where p', q', and r' are non-zero integers which are not a single integer) from the first, second, and third light beams, respectively, each diffracted light being converged by the objective lens and the grating structure on an information surface of an optical disk corresponding to each light beam.

In a preferred embodiment, the first, second, and third light beams have blue, red, and infrared wavelengths, respectively, where p'=2 and q'=r'=1.

An optical disk apparatus according to the present invention is an optical disk apparatus supporting a plurality of types of optical disks for which data reproduction is performed with a plurality of light beams including first and second light beams of respectively different wavelengths, the optical disk apparatus comprising: a motor for rotating an optical disk; and an optical pickup for accessing the optical disk, the optical pickup including: a plurality of light sources for emitting the plurality of light beams; an objective lens for converging the plurality of light beams; and a grating structure shaped axisymmetrically with respect to an optical axis of the objective lens, wherein, the objective lens and the grating structure cause $p^{th}$-order diffracted light (where p is a non-zero integer) to be converged on an information layer of an optical disk corresponding to the first light beam, the $p^{th}$-order diffracted light (where p is a non-zero integer) being formed from the first light beam by the grating structure; and the objective lens and the grating structure cause $q^{th}$-order diffracted light (where q is a non-zero integer such that $q \neq p$) to be converged on an information layer of an optical disk corresponding to the second light beam, the $q^{th}$-order diffracted light being formed from the second light beam by the grating structure.

Effects of the Invention

With an optical pickup according to the present invention, a grating having a sawteeth cross section and an objective lens are used in combination, and diffracted light of specific orders is utilized, thus making it possible to support a plurality of types of optical disks of different base thicknesses, although in an infinite optical system. In other words, with an objective lens according to the present invention, a high diffraction efficiency can be maintained across a broad wavelength range. Specifically, by using an objective lens of the above construction, and utilizing $3^{rd}$-order for blue and $2^{nd}$-order light for red or infrared, aberrations occurring due to differences in optical disk base thicknesses or influence of dispersion can be canceled, whereby the optical structure can be greatly simplified.

Figure 1:
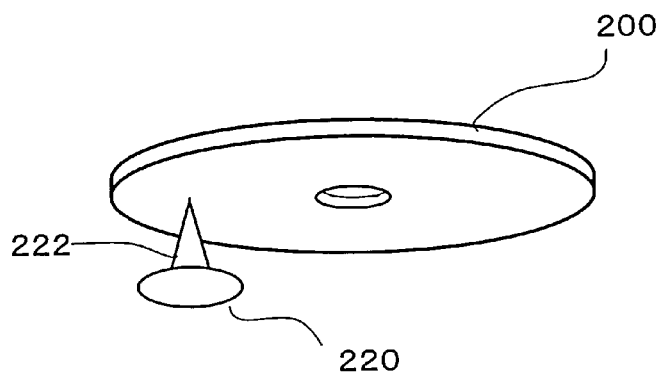
FIG. 1 A perspective view schematically showing relative positioning of an optical disk and an objective lens.
Figure 2:
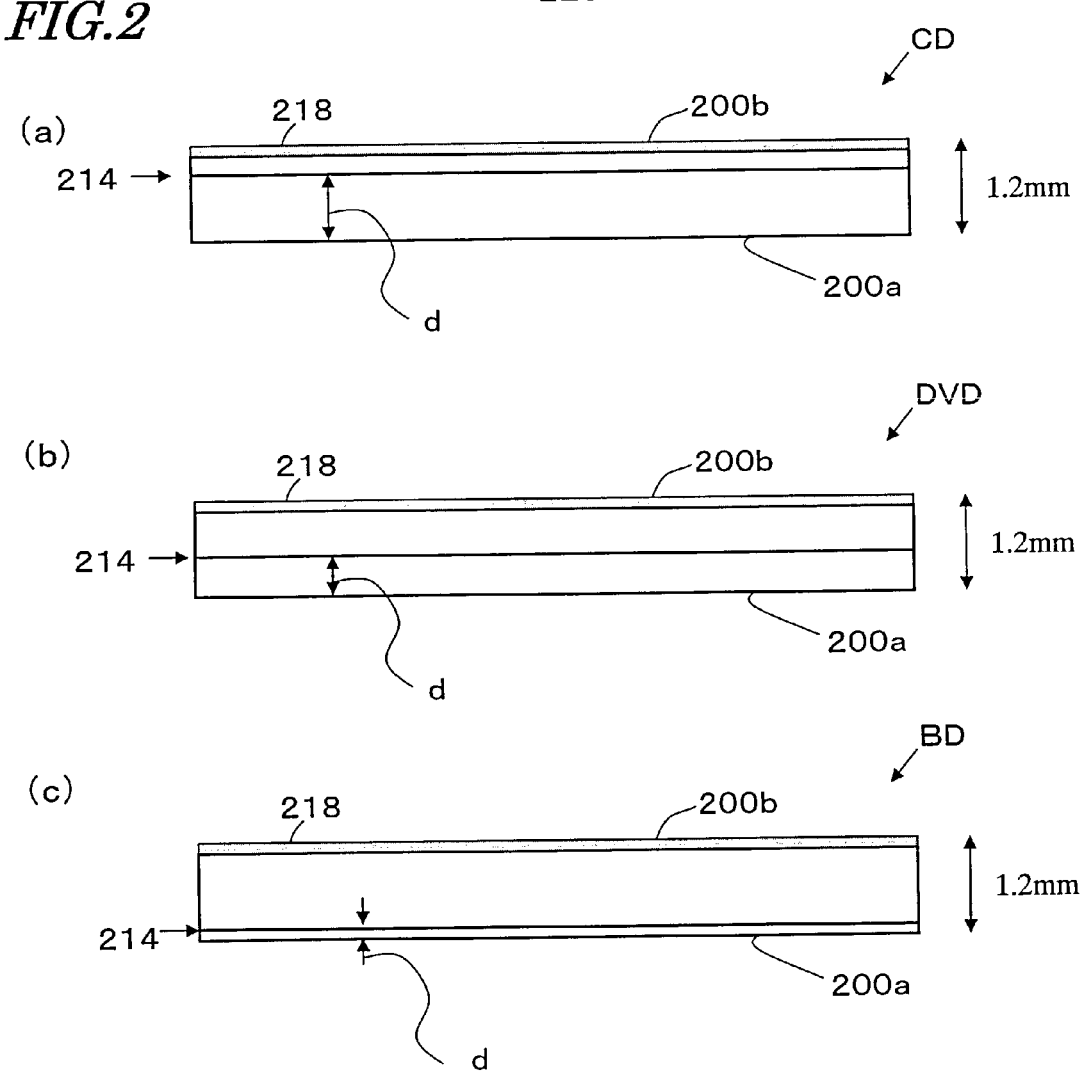
FIG. 2 (a), (b), and (c) are diagrams schematically showing general cross sections of a CD, a DVD, and a BD, respectively.
Figure 3:
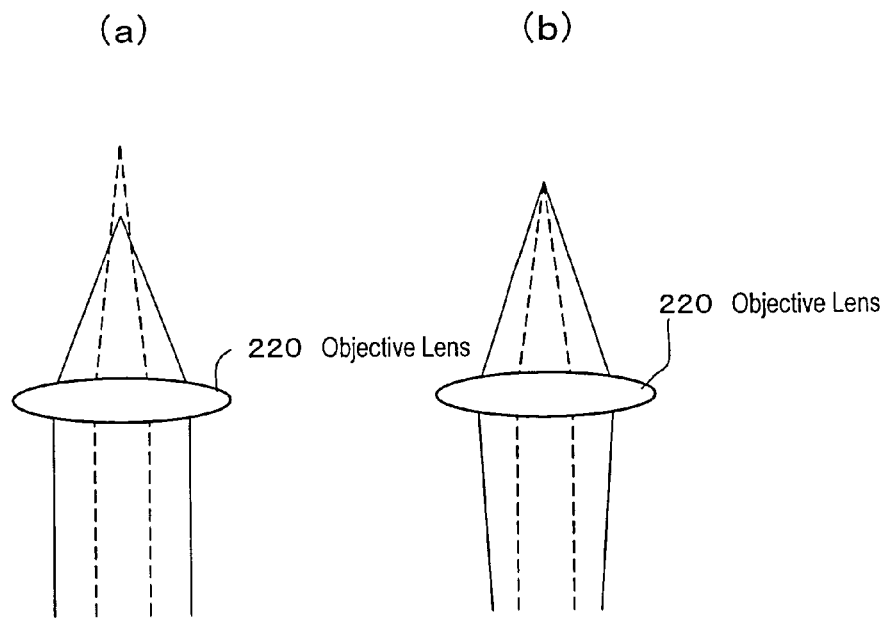
FIG. 3 (a) is a schematic diagram showing spherical aberration being caused by an objective lens when entered by parallel light; and (b) is a schematic diagram showing how the spherical aberration is corrected by allowing divergent light to enter the same objective lens as that in (a).
Figure 4:
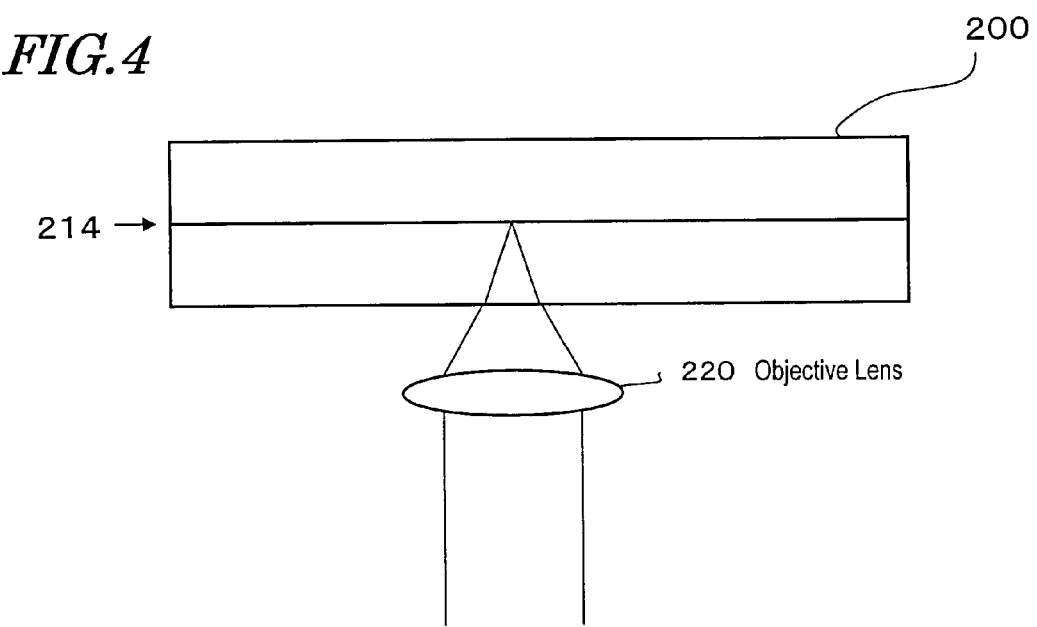
FIG. 4 A diagram showing a light beam which has entered an optical disk 200 being converged on an information layer 214.

DESCRIPTION OF THE REFERENCE NUMERALS 1B blue light source
1R red light source
1I infrared light source
L optical axis
3 collimating lens
4B plane wave rays corresponding to the blue light source
4R plane wave rays corresponding to the red light source
4I plane wave rays corresponding to the infrared light source
6 objective lens
6A first-material component
6B second-material component
6a face of the first-material component on which a grating is formed
6b face of the second-material component on which a grating is formed
7B optical disk base corresponding to the blue light source
7R optical disk base corresponding to the red light source
7I optical disk base corresponding to the infrared light source
8B optical disk information layer corresponding to the blue light source
8R optical disk information layer corresponding to the red light source
8I optical disk information layer corresponding to the infrared light source

BEST MODE FOR CARRYING OUT THE INVENTION

An optical pickup according to the present invention includes: a plurality of light sources for emitting a plurality of light beams including first and second light beams of respectively different wavelengths; an objective lens for converging the plurality of light beams; and a grating structure shaped axisymmetrically with respect to an optical axis of the objective lens. In a preferred embodiment, a diffractive lens which integrates an objective lens and a grating structure is employed.

According to the present invention, $p^{th}$-order diffracted light (where p is a non-zero integer) which is formed from a first light beam (e.g. blue) by the grating structure is converged on an information layer of an optical disk (e.g. BD) corresponding to the first light beam, owing to the converging actions of the objective lens and the grating structure. Moreover, $q^{th}$-order diffracted light (where q is a non-zero integer such that q≠p) which is formed from a second light beam (e.g. red or infrared) by the grating structure is converged on an information layer of an optical disk (e.g. a DVD or a CD) corresponding to the second light beam, owing to the converging actions of the objective lens and the grating structure. Thus, by appropriately using diffracted light of different orders, it becomes possible to perform convergence on optical disks of different wavelengths and base thicknesses, with reduced spherical aberration. In a most preferred embodiment, the condition p=3, q=2 is selected.

Hereinafter, with reference to the figures, embodiments of the optical pickup according to the present invention, and an optical pickup having such an optical pickup will be described.

Embodiment 1

Figure 20:
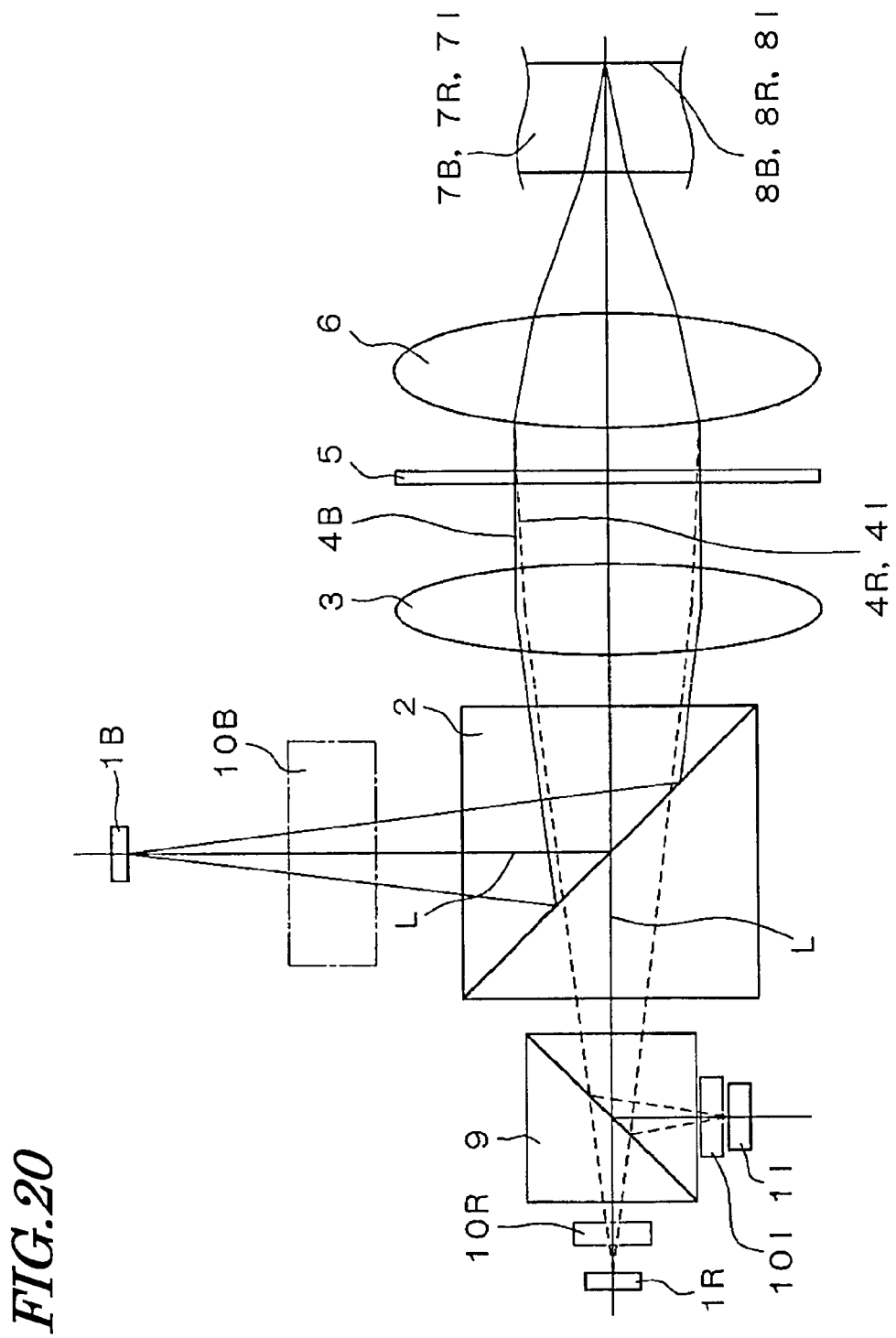
FIG. 20 An essential cross-sectional structural diagram of a conventional optical pickup.

With reference to FIG. 5 to FIG. 10, a first present embodiment of the optical pickup according to the present invention will be described. Note that, in these figures, constituent elements which are common to the conventional example shown in FIG. 20 are denoted by like reference numerals.

Figure 5:
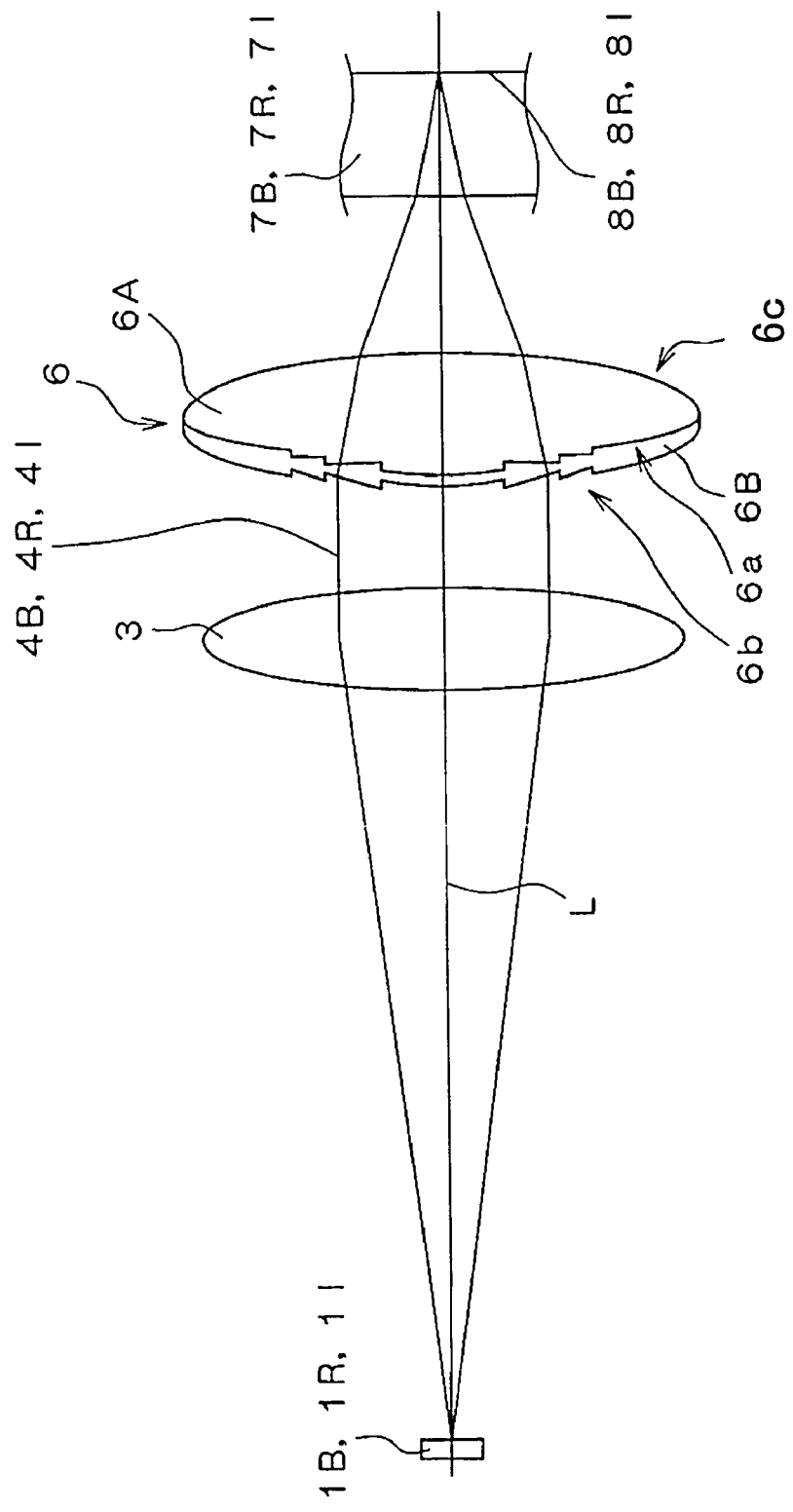
FIG. 5 An essential structural diagram of a first embodiment of an optical pickup according to the present invention.

First, FIG. 5 is referred to. FIG. 5 is a partial cross-sectional structural diagram showing an essential portion of an optical pickup of the present embodiment. For simplicity, FIG. 5 only illustrates the construction on the forward path side (i.e., starting from a light source and heading toward the disk surface), and the construction on the return path side (i.e., starting from the disk surface and heading toward a photodetector) is not illustrated.

Blue light (wavelength 0.405 μm) which is emitted from a light source 1B, e.g., a blue-light emitting semiconductor laser, travels through a collimating lens 3 so as to be converted into plane waves 4B (infinite system). The plane waves 4B travel through an objective lens 6 (NA 0.85) and are transmitted through an optical disk base 7B having a thickness of 0.1 mm, and converged on an information layer 8B which is formed on the rear face of the base 7B.

In the present embodiment, red light (wavelength μm) which is emitted from a light source 1R, e.g., a red-light emitting semiconductor laser formed on the same substrate as the light source 1B, also travels through the collimating lens 3 so as to be converted into plane waves 4R (infinite system). The plane waves 4R travel through the objective lens 6 and are transmitted through an optical disk base 7R having a thickness of 0.6 mm, and converged on an information layer 8R which is formed on the rear face of the base 7R. Moreover, infrared light (wavelength 0.790 μm) which is emitted from a light source 1I, e.g., an infrared-light emitting semiconductor laser formed on the same substrate as the light sources 1B and 1R also travels through the collimating lens 3 so as to be converted into plane waves 4I (infinite system). The plane waves 4I travel through the objective lens 6 and are transmitted through an optical disk base 7I having a thickness of about 1.2 mm, and converged on an information layer 8I which is formed on the rear face of the base 7I.

Thus, the present embodiment greatly differs from the earlier-described conventional example in that a plurality of light sources for emitting light beams of different wavelengths are disposed along substantially the same optical axis, so that all of them function as light sources of an infinite system. The reason why optical disks of different base thicknesses can be supported by the present embodiment while allowing light beams of different wavelengths to be changed into parallel light is the novel construction of the objective lens 6.

Figure 6:
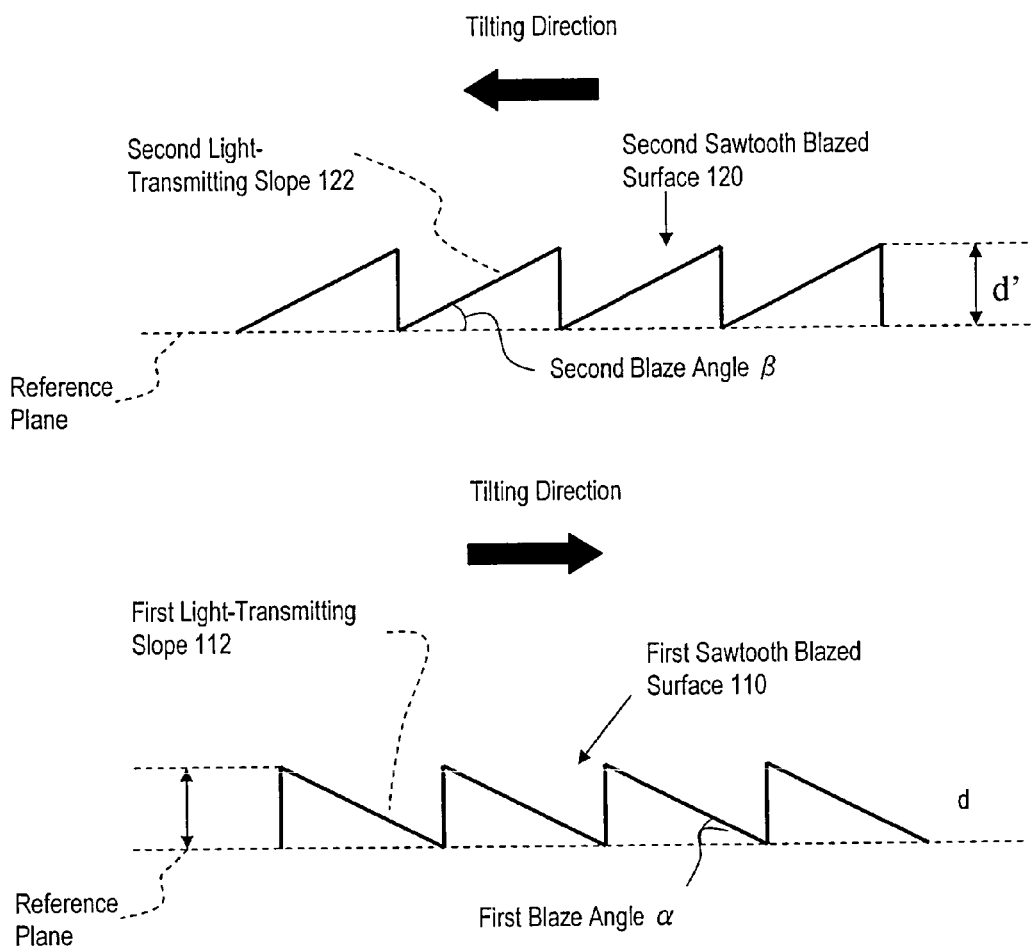
FIG. 6 A diagram showing a grating structure which is suitably used in the present invention.

Hereinafter, with reference to FIG. 6, the general construction of the objective lens 6 will be described. FIG. 6 is a diagram showing a grating structure of an objective lens. As shown in FIG. 6, the objective lens 6 according to the present embodiment includes a first light transmitting layer having a first sawtooth blazed surface and a second light transmitting layer having a second sawtooth blazed surface, these being stacked.

FIG. 6 schematically shows, in cross sections, a first sawtooth blazed surface 110 and a second sawtooth blazed surface 120 of this objective lens. The first sawtooth blazed surface 110 has a plurality of first light-transmitting slopes 112 defining a first blaze angle α, whereas the second sawtooth blazed surface 120 has a plurality of second light-transmitting slopes 122 defining a second blaze angle β.

The first sawtooth blazed surface 110 and the second sawtooth blazed surface 120 are each structured with a periodical array of unit features, each of whose cross section has a triangular shape. The height of the unit features with respect to a reference plane does not need to be identical between the first sawtooth blazed surface 110 and the second sawtooth blazed surface 120. In the example shown, the height of each unit feature (referred to as the "step height") of the first sawtooth blazed surface 110 is denoted as "d", whereas the step height of the second sawtooth blazed surface 120 is denoted as "d'".

In the present specification, between the two faces constituting the surface of each unit feature, the face having a relatively broader area will be referred to as a "light-transmitting slope", and the angle between this light-transmitting slope and the reference plane will be defined as a blaze angle. Between the two faces constituting the surface of each unit feature, the face other than the "light-transmitting slope" is generally perpendicular to the reference plane, and has substantially no effect on light diffraction.

The aforementioned blaze angle has a value satisfying the relationships of $0°<α<90°$ and $0°<β<90°$, and is an acute angle. The normal directions of the first and second light-transmitting slopes 112 and 122 are tilted with respect to the normal direction of the reference plane by an angle which is equal to the blaze angle. In the present specification, the direction of this tilt will be referred to as "the tilting direction of the light-transmitting slope", as indicated by thick black arrows in FIG. 1. In the present invention, the tilting directions of the light-transmitting slopes are set exactly opposite between the first sawtooth blazed surface 110 and the second sawtooth blazed surface 120.

Although FIG. 6 illustrates a case where the reference plane is planar, the reference plane may be curved. Moreover, the blaze angles α and β do not need to have constant values across the reference plane, but may vary with position. Although not explicitly shown in FIG. 6, the first sawtooth blazed surface 110 is formed on a first light transmitting layer, whereas the second sawtooth blazed surface 120 is formed on a second light transmitting layer.

The objective lens 6 in FIG. 5 is produced from two types of transparent materials (plastic, UV-curing resin, or the like) having different refractive indices and different dispersion characteristics. A body 6A has a lens shape, and has a light-incident face 6a and a light-outgoing face 6c. A grating is formed on the light-incident surface 6a of the body 6A, the grating having a sawteeth-shaped cross section. The body 6A functions as a "second light transmitting layer".

The surfaces 6a and 6c of the body 6A constitute a sphere or non-sphere, with its center axis being an optical axis L. On the surface 6a, the plurality of light-transmitting slopes composing the grating each have an annular shape whose center axis is the optical axis L, and they are arrayed in radial directions. Thus, steps of the grating are formed in concentric circles centered around the optical axis.

A transparent layer 6B is formed on the light-incident surface 6a of the body 6A, and functions as a "first light transmitting layer". A grating is formed on a surface 6b of the transparent layer 6B, the grating having a "tilting direction" which is opposite to the "tilting direction" of the grating on the surface 6a. On the surface 6b, too, the plurality of light-transmitting slopes composing this grating each have an annular shape whose center axis is the optical axis L, and they are arrayed in radial directions.

In the present embodiment, each "tilting direction" shown in FIG. 6 either heads toward the optical axis L, or generally radially extends from the optical axis. Thus, in the present embodiment, when the "tilting directions" of the two stacked gratings are in an exactly opposite relationship, it is meant that exactly opposite "tilting directions" exist at positions of upper-lower proximity (i.e., corresponding positions), and the relationship between "tilting directions" at different positions may not necessarily be exactly opposite.

Note that, instead of being sawteeth-like as shown, the grating cross sections may be in the form of small steps inscribed within the illustrated sawteeth shape.

An optical convergence device having such a construction is disclosed in an international application (PCT/JP2005/017773) filed on Sep. 27, 2005. The entire disclosure of this international application is incorporated herein by reference.

In the example shown in FIG. 5, between the two layers of gratings, the edge positions (lower-blade positions) of sawteeth are aligned. The refractive index and dispersion of the transparent layer 6B in the present embodiment are lower than the refractive index and dispersion of the body 6A. Preferably, the transparent layer 6B is formed so that its thickness is as thin as possible, and is formed to a thickness of several μm or less, for example.

The objective lens 6 having such a construction is produced in the follow manner, for example.

First, the body 6A is provided, which has been molded so as to have a lens shape with a grating formed on a surface thereof. Next, the body 6A is inserted into a die (not shown) which has a molding face having the shape of a lens with a grating, and the interspace between the body 6A and the die is filled with a second material. After curing the second material by a method such as UV curing or thermosetting, the second material is released from the die. As a result, the objective lens 6 shown in FIG. 5 is obtained.

Light 4B, 4R, and 4I entering the objective lens 6 simultaneously experiences refraction and diffraction at the surface 6b of the transparent layer 6B and the surface 6a of the body 6A, and further receives refraction at the opposite face 6c of the body 6A, thus becoming light which is converged on the information layers 8B, 8R, and 8I.

Figure 7:
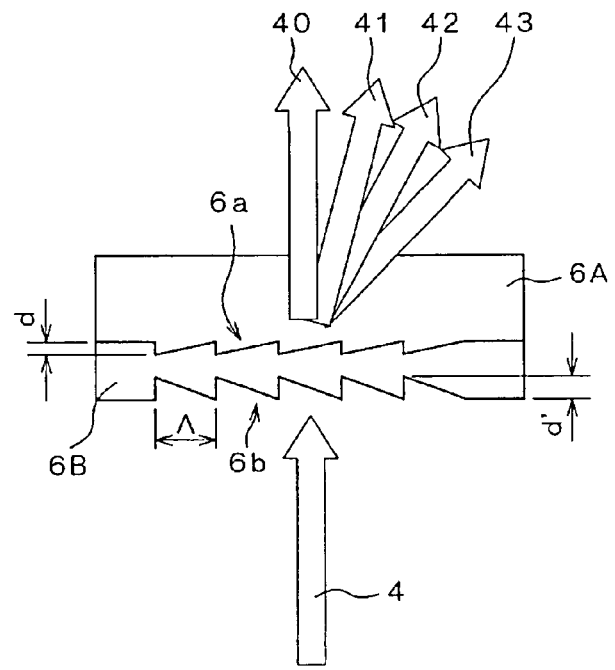
FIG. 7 A diagram for explaining principles of diffraction at an objective lens surface in the first embodiment.

Next, with reference to FIG. 7, the diffraction by the objective lens 6 will be described. FIG. 7 is a diagram for explaining the principles of diffraction by the objective lens. For simplicity, FIG. 7 illustrates each face as being planar, while also assuming that the light 4 perpendicularly enters the face.

It is assumed that the body 6A has a refractive index n; the transparent layer 6B has a refractive index n'; the grating formed on the face 6a has a pitch $\Lambda$ and a cross-sectional step height d; the grating formed on the face 6b has a pitch $\Lambda$ and a cross-sectional step height d'. In this case, the wavefront of the light which is transmitted through these gratings will be in the form of sawteeth with the pitch $\Lambda$. The difference $\Delta$ (phase difference) is expressed by (eq. 1) below.

$$\Delta = d'(n'-1) - d(n-n') \quad \text{(eq. 1)}$$

The refractive indices n and n' are each separated into a portion (first term) which does not depend on the wavelength $\lambda$ and a portion (second term) which depends on the wavelength $\lambda$, and approximated by (eq. 2) and (eq. 3) below.

$$n = n0 - (\lambda - \lambda 0)\sigma \quad \text{(eq. 2)}$$

$$n' = n0' - (\lambda - \lambda 0)\sigma' \quad \text{(eq. 3)}$$

Herein, n0, n0', $\lambda$0, $\sigma$, and $\sigma'$ are all positive numbers, where: $\lambda$0 is a central wavelength; n0 and n0' are refractive indices at the central wavelength; and $\sigma$ and $\sigma'$ are coefficients of dispersion.

A phase difference $\Delta$ can be expressed by (eq. 4) below.

$$\Delta = d'(n0'-1) - d(n0-n0') - (\lambda - \lambda 0)\{d'\sigma' - d(\sigma - \sigma')\} \quad \text{(eq. 4)}$$

Since the light 4 of the wavelength $\lambda$ will have the phase difference $\Delta$ with a period of the pitch $\Lambda$ due to transmission, diffracted waves such as $1^{st}$-order diffracted light 41, $2^{nd}$-order light 42, and $3^{rd}$-order diffracted light 43 will be generated, in addition to $0^{th}$-order diffracted light 40. Given an integer q, the diffraction angle $\theta$ of $q^{th}$-order diffracted light (i.e., the angle between itself and the surface normal) is given by (eq. 5) below.

$$\sin\theta = q\lambda/\Lambda \quad \text{(eq. 5)}$$

A condition under which the diffraction efficiency of $q^{th}$-order diffracted light becomes maximum is given by (eq. 6) below.

$$\Delta = q\lambda \quad \text{(eq. 6)}$$

Therefore, the condition under which the diffraction efficiency reaches maximum when $\lambda = \lambda 0$ and under which the amount of change of $|\Delta/\lambda|$ with respect to $\lambda$ becomes small (i.e., a condition under which a high diffraction light efficiency is maintained across a broad wavelength region) is expressed by (eq. 7) and (eq. 8) below.

$$\{d'(n0'-1) - d(n0-n0')\}/\lambda = q \quad \text{(eq. 7)}$$

$$\{d'\sigma' - d(\sigma - \sigma')\}/q\lambda 0 < 0 \quad \text{(eq. 8)}$$

Note that the Abbe number is a value which is in proportion with an inverse of each of $\sigma$ and $\sigma'$. Therefore, assuming that Abbe numbers corresponding to $\sigma$ and $\sigma'$ are $\nu$ and $\nu'$, (eq. 8) can be replaced by (eq. 9) below.

$$d'/d < \nu'/\nu - 1 \quad \text{(eq. 9)}$$

(Eq. 9) indicates that, when $\nu' > \nu$, it is easy to reduce the amount of change of $|\Delta/\lambda|$ with respect to $\lambda$.

Figure 8:
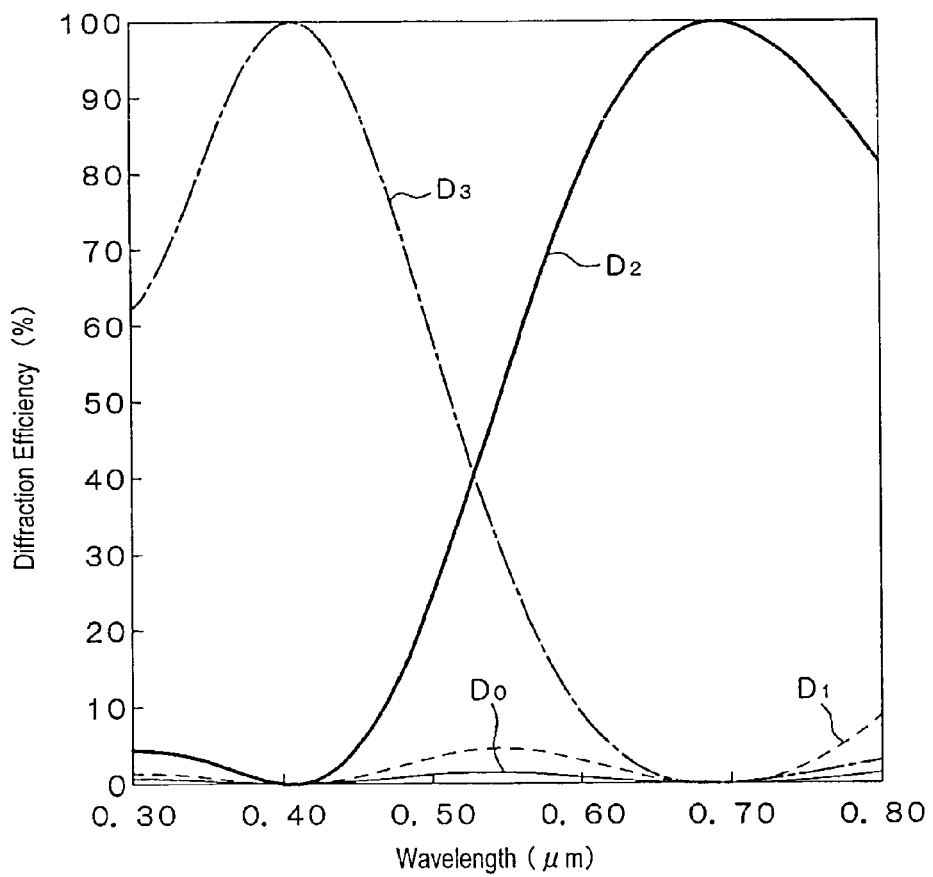
FIG. 8 A diffraction efficiency characteristic diagram at an objective lens surface according to the first embodiment.

FIG. 8 shows the wavelength dependence of diffraction efficiency of each diffracted light in the optical lens of the present embodiment. Herein, the body 6A is formed of a high-dispersion transparent plastic material (e.g., a product named O-PET by Kanebo Inc. (n=1.62, $\nu$=24); the same will always apply below), and the transparent layer 6B is formed of a UV resin (n'=1.49, $\nu'$=59). The step heights d and d' are set so that d=6.6 μm, d'=4.5 μm. However, the refractive index n at the wavelength $\lambda$ is approximated according to (eq. 10) below, where $\nu$d is the Abbe number at the d line (wavelength $\lambda$ d=0.5876 μm); nd is the refractive index at the d line; nC is the refractive index at the c line (wavelength $\lambda$C=0.6563 μm); and nF is the refractive index at the F line (wavelength $\lambda$ F=0.4861 μm).

$$n = nd - (\lambda d^{-2} - \lambda^{-2})(nd-1)/\nu d(\lambda F^{-2} - \lambda C^{-2}) \quad \text{(eq. 10)}$$

The following calculations will all employ this approximation (eq. 10).

In FIG. 8, curve D0 represents the characteristics of $0^{th}$-order diffracted light; curve D1 represents the characteristics of $1^{st}$-order diffracted light; curve D2 represents the characteristics of $2^{nd}$-order light; and curve D3 represents the characteristics of $3^{rd}$-order diffracted light. Curve D3 indicates a diffraction efficiency of almost 100% at the wavelength of 0.405 μm, whereas curve D2 indicates diffraction efficiencies of 98% and 83% at the wavelength of 0.660 μm and the wavelength of 0.790 μm.

Since $\nu' > \nu$ is satisfied, each curve has characteristics such that a high diffraction light efficiency is maintained across a broad wavelength region. Thus, it can be seen that, while being a single lens that utilizes diffraction, the objective lens 6 of the present embodiment is able to maintain a high light-diffraction efficiency for any of the three wavelengths of light.

Note that the diffraction phenomenon at the grating structure on the faces 6a and 6b can also be explained as follows. Assuming that m and m' are integers, suppose that the step height d and d' satisfy (eq. 11) and (eq. 12) below.

$$d = |m\lambda 0/(n-n')| \quad \text{(eq. 11)}$$

$$d' = |m'\lambda 0'/(n'-1)| \quad \text{(eq. 12)}$$

In this case, $m^{th}$-order light is diffracted by the grating on the face 6a mainly at the wavelength of $\lambda 0$, and $m'^{th}$-order light is diffracted by the grating on the face 6b mainly at the wavelength of $\lambda 0'$. Although the wavelengths $\lambda 0$ and $\lambda 0'$ are near, they do not need to be equal. In this case, $(m+m')^{th}$-order light is diffracted by the entire grating structure at wavelengths in the neighborhood from $\lambda 0$ to $\lambda 0'$. In the example of FIG. 8, curve D3 is of the relationship m=5; m'=−2; m+m'=3 for wavelengths near 0.405 μm, whereas curve D2 is of the relationship m=3; m'=−1; m+m'=2 for wavelengths near 0.690 μm.

Figure 9:
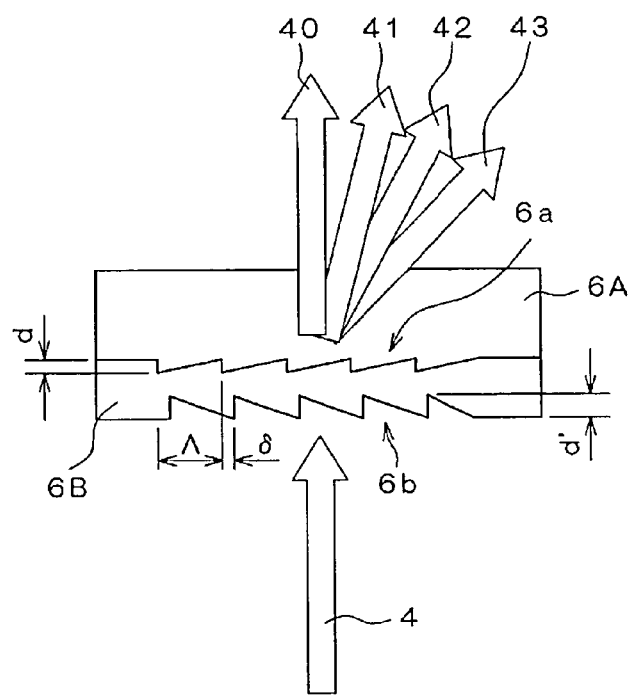
FIG. 9 An explanatory diagram for explaining principles of diffraction at an objective lens surface according to an embodiment within the first embodiment.
Figure 10:
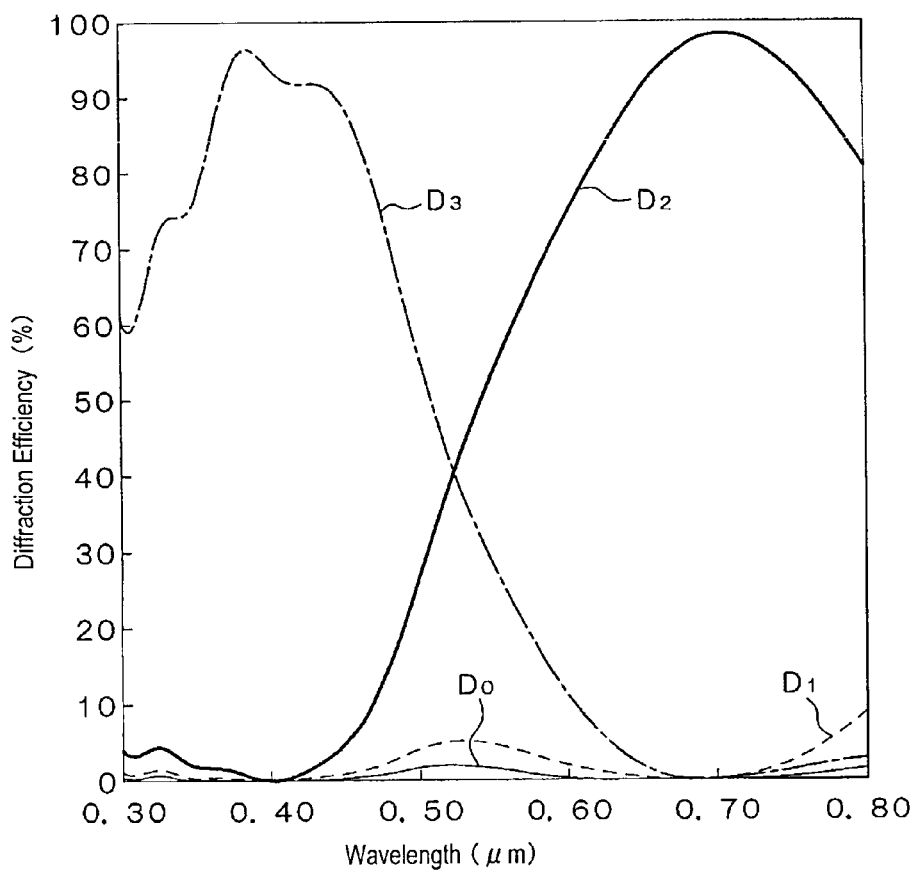
FIG. 10 A diffraction efficiency characteristic diagram at the objective lens surface shown in FIG. 9.

As shown in FIG. 9, in the case where the step height positions on the gratings on the faces 6a and 6b have an offset of 6 along the lateral direction, the diffraction efficiencies will change as shown in FIG. 10. FIG. 10 is a graph showing calculation results for the case where $\delta/\Lambda = 0.02$, the other conditions being equal to the conditions illustrated in FIG. 8.

Curve D3 ($3^{rd}$-order diffracted light) indicates a diffraction efficiency of 93% at the wavelength of 0.405 µm. Curve D2 ($2^{nd}$-order light) indicates diffraction efficiencies of 94% and 83% at the wavelength of 0.660 µm and the wavelength of 0.790 µm. Thus, an offset in the step height positions is recognized to produce a slight decrease in efficiency. Therefore, it is preferable to keep the offset in the step height positions to about 2 to 3% or less.

Next, convergence by the objective lens 6 of the present embodiment will be discussed in terms of aberration. If an objective lens were designed while ignoring the diffraction by the grating (base objective lens), assuming a base thickness x of the optical disk, the diffraction would impose a spherical aberration corresponding to a base thickness of (x+0.1) on the light of the blue wavelength $\lambda 1$, a spherical aberration corresponding to a base thickness of (x+0.6) on the light of the red wavelength $\lambda 2$, and a spherical aberration corresponding to a base thickness of (x+1.2) on the light of the infrared wavelength $\lambda 3$. Thus, spherical aberrations corresponding to base thicknesses of 0.1, 0.6, and 1.2 can be absorbed, respectively. In actuality, there are influences of dispersion associated with wavelength differences, so that a disk or lens will have a greater refractive index and a correspondingly greater spherical aberration as the wavelength is shorter. Such increments in spherical aberration could be converted into base thickness differences, thus resulting in aberration amounts t1, t2, and t3 (where the infrared wavelength is used as a reference of dispersion; t3=0) for the blue wavelength $\lambda 1$, the red wavelength $\lambda 2$, and the infrared wavelength $\lambda 3$. Herein, it holds that t1>t2>t3=0 because aberration acts toward the plus side of base thickness difference as the wavelength is shorter.

Accordingly, the diffraction will impose a spherical aberration corresponding to a base thickness of (x+0.1+t1) on the light of the blue wavelength $\lambda 1$, a spherical aberration corresponding to a base thickness of (x+0.6+t2) on the light of the red wavelength $\lambda 2$, and a spherical aberration corresponding to a base thickness of (x+1.2+t3) on the light of the infrared wavelength $\lambda 3$. Thus, spherical aberrations corresponding to base thicknesses of 0.1, 0.6, and 1.2, respectively, plus spherical aberrations due to influences of dispersion, are absorbed. On the other hand, an aberration occurring with diffraction is in proportion with: diffraction order×wavelength. Therefore, (eq. 13) below holds true, assuming the following diffraction orders at the grating: a $p^{th}$-order at the blue wavelength $\lambda 1$, a $q^{th}$-order at the red wavelength $\lambda 2$, and an $r^{th}$-order at the infrared wavelength $\lambda 3$.

$$(x+0.1+t1):(x+0.6+t2):(x+1.2+t3)=p\lambda 1:q\lambda 2:r\lambda 3 \quad \text{(eq. 13)}$$

Now, tentatively assuming that q=r; $\lambda 1$=0.405 µm; $\lambda 2$=0.660 µm; and $\lambda 3$=0.790 µm, and further by approximation that t2=t3=0 (since the dispersion at the red wavelength or any greater wavelengths is small), (eq. 13) says x=2.446 mm, so that (eq. 14) below holds true.

$$p/q=660(x+0.1+t1)/405(x+0.6) \quad \text{(eq. 14)}$$

Assuming t1=0, it holds that p/q=1.362. Thus, p/q will take a value close to 1.5 when t1>0. When t1=0.258, p/q=1.5. Although t1 could be increased by using a high-dispersion (low Abbe number) lens material for the objective lens or increasing the lens thickness, an actual calculation under a lens thickness of 2 mm and a focal length of 3 mm shows that it can only be as large as about 0.3 mm, even when assuming a material with the greatest dispersion (Abbe number of about 20). Note that, other than lens thickness, the value of t1 is also influenced by the working distance, focal length, amount of offense against the sine condition, etc.

Therefore, under conservative design parameters, any combination other than p/q=1.5, such as p/q=2 (p=2, q=r=1), would be physically impossible. Stated otherwise, p/q=1.5 may well be satisfied by appropriately selecting the lens material, lens thickness, and the like. Therefore, the combination of diffraction orders according to the present embodiment (p=3, q=r=2) can be said to be an optimum combination that can cancel aberrations associated with base thickness differences and refractive index dispersion. In fact, in a model calculation where O-PET (nd=1.62, vd=24) is used as the glass lens material, spherical aberrations corresponding to base thicknesses of 0.1, 0.6, and 1.2 and spherical aberrations due to influences of dispersion are almost completely absorbed, within NA 0.5. Thus, it can be said that it is highly likely that aberrations can be canceled if the Abbe number of the glass lens material is 30 or less.

Note that the objective lens 6 is partitioned into three zones, i.e., NA=0.0 to 0.5; NA=0.5 to 0.65; and NA=0.65 to 0.85. Where NA=0.0 to 0.5, the above-described construction is required because both diffraction performance and aberration performance must be satisfied for the there wavelengths (blue, red, infrared) of light. However, diffraction efficiency performance and aberration performance only need to be satisfied for two wavelengths (blue, red) of light where NA=0.5 to 0.65, and one wavelength (blue) of light where NA=0.65 to 0.85, which makes it possible to employ other constructions, including the cross-sectional structure and design specifications.

In particular, in a design where the NA>0.5 region does not satisfy the third proportion in (eq. 13) with respect to infrared light, the infrared light which is transmitted through the NA>0.5 region will be dissipated on the disk information layer and the photodetection surface. As a result, the objective lens 6 will act as an NA=0.5 aperture filter with respect to infrared light.

Similarly, in a design where the NA>0.65 region does not satisfy the second proportion in (eq. 13) with respect to red light, the red light which is transmitted through the NA>0.65 region will be dissipated on the disk information layer and the photodetection surface. As a result, the objective lens 6 will act as an NA=0.65 aperture filter with respect to red light. Thus, no aperture filter 5 is required unlike in the conventional example, which greatly contributes to lower costs.

Since three light sources are disposed so as to each form an infinite system in the present embodiment, problems due to displacements of the objective lens associated with tracking control (coma aberration occurring in the light converged on the disk information layer, thus resulting in the problematic deteriorations of reproduction performance and recording performance). Thus, it is applicable to light sources in which a plurality of light sources are formed on the same substrate, e.g., two-wavelengths lasers or three-wavelengths lasers. It will be appreciated that the grating cross sections formed on the surfaces 6a and 6b may be in the form of steps inscribed within the sawteeth, which may facilitate machining depending on the machining method, although the diffraction efficiency will be deteriorated as compared to sawteeth-like shapes.

Furthermore, although the objective lens 6 is plastic-based and has a UV curing resin layer attached thereto, use of a plastic as a base will result in large changes in shape in response to temperature differences, thus lacking in reliability. Therefore, by using a high-dispersion glass lens material as a base lens (having no gratings) (which is not required to have a high refractive index although it needs to have a high dispersion for aberration cancellation), a high refractive index/high-dispersion plastic with a grating may be provided on its surface, upon which a low refractive index/low-dispersion UV-curing resin with a grating may be formed.

Note that although the objective lens 6 is able to remove spherical aberration with a design that satisfies (eq. 13), some Defocus aberration ($1^{st}$-order spherical aberration) associated with wavelength differences may still exist depending on the design. Such an aberration is in proportion with a deviation of each of the focal lengths of the objective lens 6 for the three light sources. For example, calculation results have been obtained which show that, when a focal length of the objective lens has a deviation of about 1/10 of the average value of each focal length, there exists a Defocus=1 μm associated with a wavelength difference of 1 nm of the blue light source. Therefore, if this deviation can be reduced to 1/50 or less of the average value of focal length, Defocus aberrations associated with wavelength differences can be said to be sufficiently small.

Note that, in the case where the disk base thickness for the blue light source is e.g. 0.6 mm, which is adopted for HD-DVD, (eq. 14) can be replaced by (eq. 15) below.

$$p/q=660(x+0.6+t1)/405(x+0.6) \qquad \text{(eq. 15)}$$

In eq. 15, p/q=1.6302 when t1=0; and p/q=2.0 when t1=0.692 (combination of p=2, q=r=1). Even assuming a material of the largest dispersion, t1=0.692 would be an impossible value, and an aberration-canceling condition with a disk base thickness of 0.6 mm would be difficult to find. However, if the disk base thickness is 0.3 mm, p/q=1.473 when t1=0. Thus, it may be possible to satisfy p/q=1.5 by using a small-dispersion material. Therefore, in order to cancel aberrations associated with base thickness differences and refractive index dispersion based on a combination of diffraction orders, it is necessary that the disk base thickness for the blue light source is 0.3 mm or less, this being satisfied by 0.1 mm, which is adopted in Blu-Ray Disks.

Although the above-described optical pickup includes three types of light sources for supporting three wavelengths, an optical pickup according to the present invention may include two types of light sources for supporting two wavelengths. In that case, it is most preferable to utilize diffracted light of p=3 for blue, and diffracted light of q=2 for red or infrared.

Next, with reference to FIG. 21, an embodiment of an optical disk apparatus according to the present invention will be described. This embodiment includes: an optical pickup 300 having the construction shown in FIG. 5; a disk motor 302 for rotating an optical disk 200; and a portion for performing various signal processing.

Figure 21:
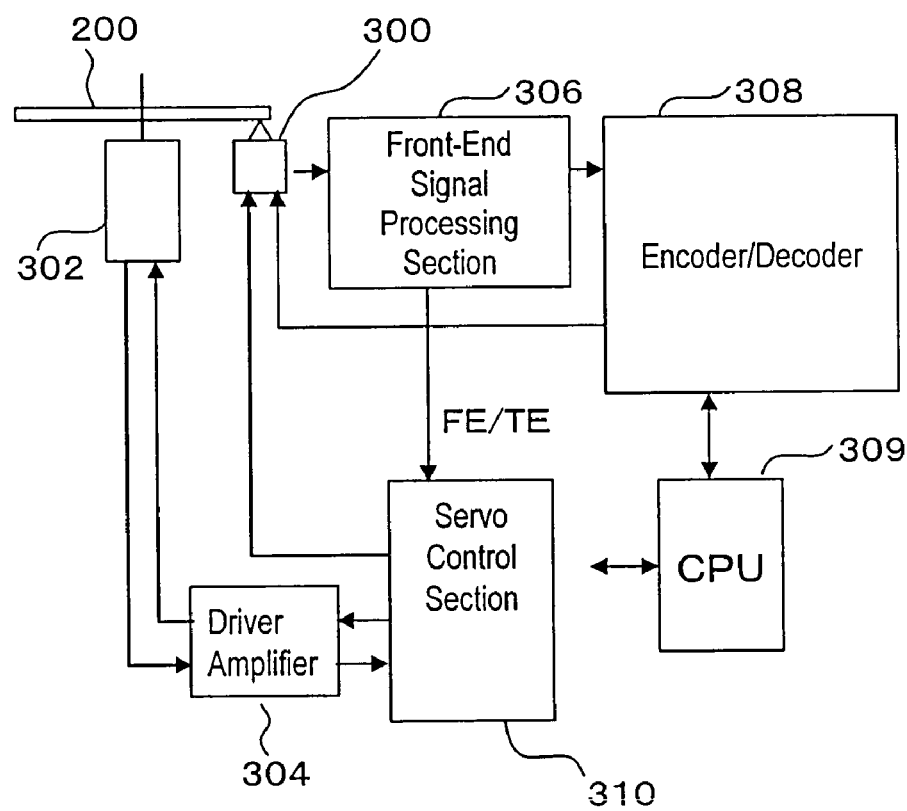
FIG. 21 A diagram showing an exemplary construction of an optical disk apparatus according to the present invention.

In the example shown in FIG. 21, the output from the optical pickup 300 is sent to an encoder/decoder 308 via a front-end signal processing section 306. During data read, the encoder/decoder 308 decodes data which is recorded on the optical disk 200, based on a signal that is obtained by the optical pickup 300. During data write, the encoder/decoder 308 encodes user data, generates a signal to be written to the optical disk 200, and sends it to the optical pickup 300.

The front-end signal processing section 306 generates a reproduction signal based on the output from the optical pickup 300, and also generates a focus error signal FE and a tracking error signal TE. The focus error signal FE and the tracking error signal TE are sent to a servo control section 310. The servo control section 310 controls the disk motor 302 via a driver amplifier 304, and also controls the position of the objective lens via an actuator in the optical pickup 300.

Constituent elements such as the encoder/decoder 308 and the servo control section 310 are controlled by a CPU 309.

Without being limited to that which has the construction shown in FIG. 21, an optical disk apparatus according to the present invention can be obtained by replacing an optical pickup in any other known optical disk apparatus with the optical pickup according to the present invention.

Note that each embodiment of an optical pickup described below may also be suitably used as a constituent element of an optical disk apparatus, together with known constituent elements, as shown in FIG. 21.

Embodiment 2

Next, with reference to FIG. 11, a second embodiment of the optical pickup according to the present invention will be described. The construction of the present embodiment is identical to the construction of Embodiment 1 except for the objective lens 6, and detailed descriptions of the common elements will be omitted.

In the present embodiment, the pitch and step height of the grating which is formed on the face 6b of the objective lens 6 are different from the pitch and step height of the grating which is formed on the face 6b of the objective lens 6 in Embodiment 1.

Figure 11:
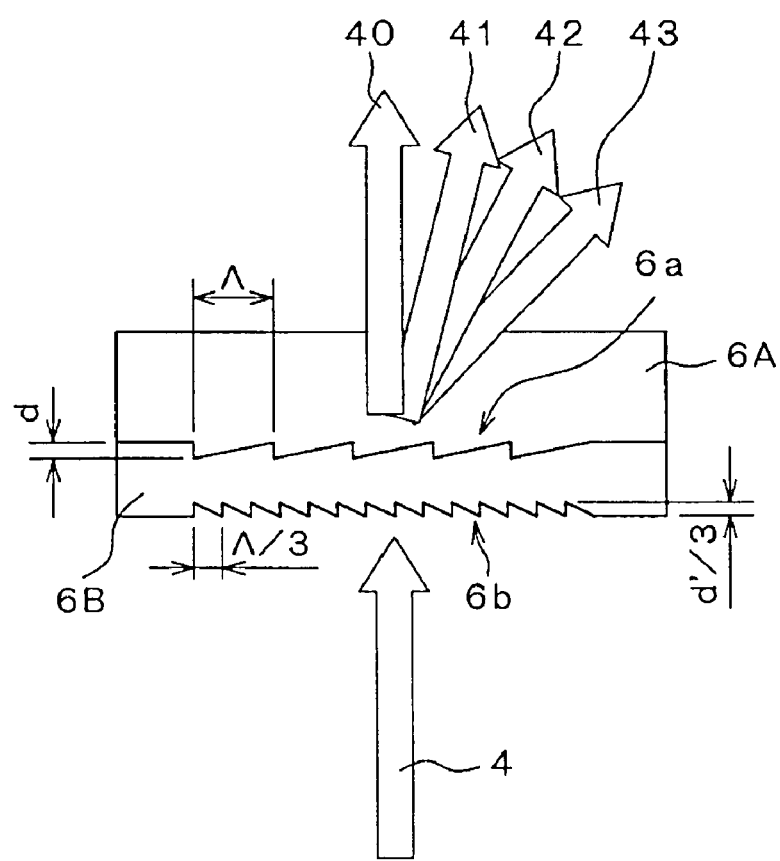
FIG. 11 A diagram for explaining principles of diffraction at an objective lens surface in a second embodiment of an optical pickup according to the present invention.

FIG. 11 is an explanatory diagram for explaining the principles of diffraction at the faces 6a and 6b of the objective lens of the present embodiment. For simplicity, it is assumed that each face is a plane, and that light perpendicularly enters each face. It is assumed that the body 6A has a refractive index n; the transparent layer 6B has a refractive index n'; the grating formed on the face 6a has a sawteeth-like cross section with a pitch Λ and a step height d; and the grating formed on the face 6b has a sawteeth-like cross section with a pitch Λ/3 and a step height d'/3.

In Embodiment 1, with respect to wavelengths near 0.690 μm, $3^{rd}$-order diffracted light is obtained by the grating formed on the face 6b, and $-1^{st}$-order diffracted light is obtained by the grating formed on the face 6a, so that 3−1=$2^{nd}$-order light is being generated by the entire grating structure on the faces 6b and 6a. On the other hand, in the present embodiment, the respective step heights are d=6.6 μm and d'/3=1.5 μm, and the diffractive action of the grating formed on the face 6a remains the same, whereas the diffraction by the grating formed on the face 6b results in a different order number according to (eq. 12) (i.e., from $3^{rd}$-order to $1^{st}$-order), but the grating pitch is 1/3 so that the diffraction direction remains unchanged according to (eq. 5). Therefore, the diffractive action of the entire structure of the faces 6b and 6a is quite identical between the present embodiment and Embodiment 1.

Thus, although the pitch and step height of the gratings are different, quite the same effects as those in Embodiment 1 are obtained. Therefore, in the case of gratings with a coarse pitch, the step height of the gratings can be made shallow by adopting the present embodiment, thus producing an advantage of facilitated production when forming the gratings, e.g., die cutting/grinding steps. Moreover, the actually-produced steps will have machining errors such that they are tilted rather than being perpendicular to the faces, and such machining errors will induce light scattering. Therefore, adopting the present embodiment, which allows for shallower grating step heights, also produces an effect of reducing light scattering.

Embodiment 3

Next, a third embodiment of the optical pickup according to the present invention will be described with reference to FIG. 12. The construction of the present embodiment is quite identical to the construction of Embodiment 1 except that the light source 1B such as a blue-light emitting semiconductor laser is separated from the other light source (1R, 1I), and a chromatic aberration correcting device 11 and a dichroic mirror prism 2 are added. The constituent elements which are common to those in the optical pickup of Embodiment 1 will be described with identical reference numerals.

Figure 12:
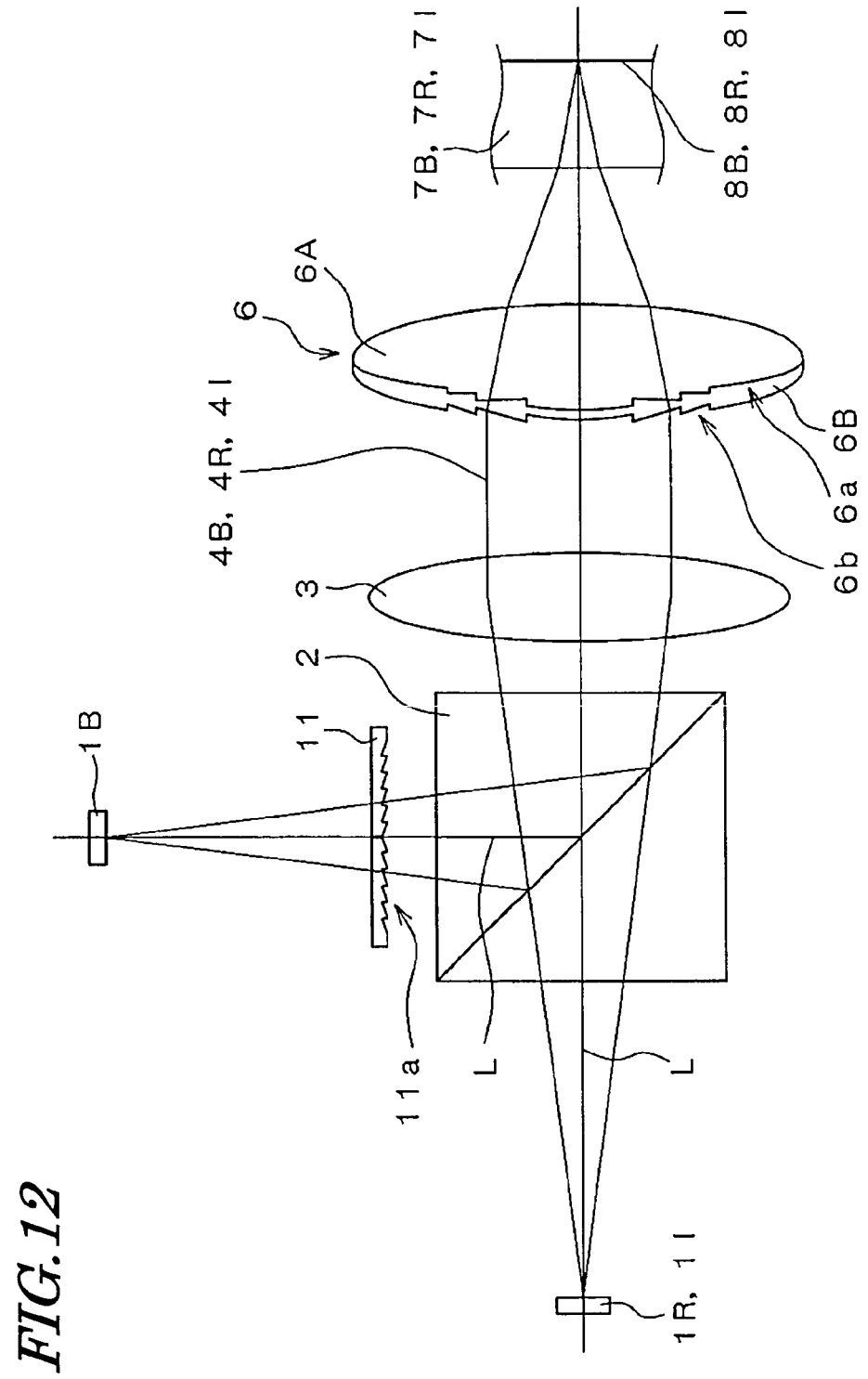
FIG. 12 An essential structural diagram of a third embodiment of an optical pickup according to the present invention.

FIG. 12 shows a cross-sectional structure of the optical pickup of Embodiment 3. In FIG. 12, blue light (e.g., wavelength: 0.405 µm) that is emitted from the light source 1B, e.g., a blue-light emitting semiconductor laser, is transmitted through the chromatic aberration correcting device 11, reflected by the dichroic mirror prism 2 (which reflects blue light and transmits wavelengths longer than blue), and travels through the collimating lens 3 so as to be converted into plane waves 4B (a so-called infinite system). The plane waves 4B travel through the objective lens 6 (NA=0.85) and are transmitted through an optical disk base 7B having a base thickness of 0.1 mm, and converged on an information layer 8B which is formed on the rear face of the base (opposite face of the incident face).

On the other hand, red light (e.g., wavelength: 0.660 µm) that is emitted from the light source 1R, e.g., a red-light emitting semiconductor laser, which is formed on a different substrate from that of the light source 1B, is transmitted through the dichroic mirror prism 2, travels through the collimating lens 3 so as to be converted into plane waves 4R (a so-called infinite system). The plane waves 4R travel through the objective lens 6 and are transmitted through an optical disk base 7R having a base thickness of 0.6 mm, and converged on an information layer 8R which is formed on the rear face of the base.

Furthermore, infrared light (e.g., wavelength: 0.790 µm) that is emitted from the light source 1I, e.g., an infrared-light emitting semiconductor laser, which is formed on the same substrate as that of the light source 1R, is transmitted through the dichroic mirror prism 2, travels through the collimating lens 3 so as to be converted into plane waves 4I (a so-called infinite system), travels through the objective lens 6 and are transmitted through a optical disk base 7I having a base thickness of 1.2 mm, and converged on an information layer 8I which is formed on the rear face of the base.

The objective lens 6 has quite identical construction to that of the objective lens 6 of Embodiment 1, and produces effects similar to the effects obtained in Embodiment 1.

The chromatic aberration correcting device 11 is obtained by forming a grating having a sawteeth-like cross section on one face 11a of the transparent substrate, so as to be concentric with the optical axis L. Because of this grating, within the blue light (wavelength 0.405 µm in this example) which is emitted from the light source 1B, light of a specific order (e.g. $1^{st}$-order) is strongly diffracted. Although the objective lens 6 is able to remove spherical aberration with a design that satisfies (eq. 13), Defocus aberration ($1^{st}$-order spherical aberration) associated with wavelength differences may still exist depending on the design. Since the influence of dispersion is particularly large for blue wavelengths, about 1 µm of Defocus (displacement in the position of point of convergence) may occur from a wavelength difference of 1 nm. In the present embodiment, by inserting the chromatic aberration correcting device 11 in the optical path for blue light, a wavelength difference in the transmitted light appears as a difference in the diffraction direction (i.e., Defocus aberration), and is utilized for the Defocus aberration correction by the objective lens 6. Thus, although the optical components increase in number as compared to Embodiment 1, there is an advantage of increased design freedom. Note that the cross section of the grating which is formed on the chromatic aberration correcting device 11 may be in the form of steps inscribed within the sawteeth.

Embodiment 4

Next, a fourth embodiment of the optical pickup according to the present invention will be described with reference to FIG. 13 to FIG. 15. The construction of the present embodiment is identical to the construction of Embodiment 1 except for the objective lens 6, and detailed descriptions of the common elements will be omitted.

Figure 13:
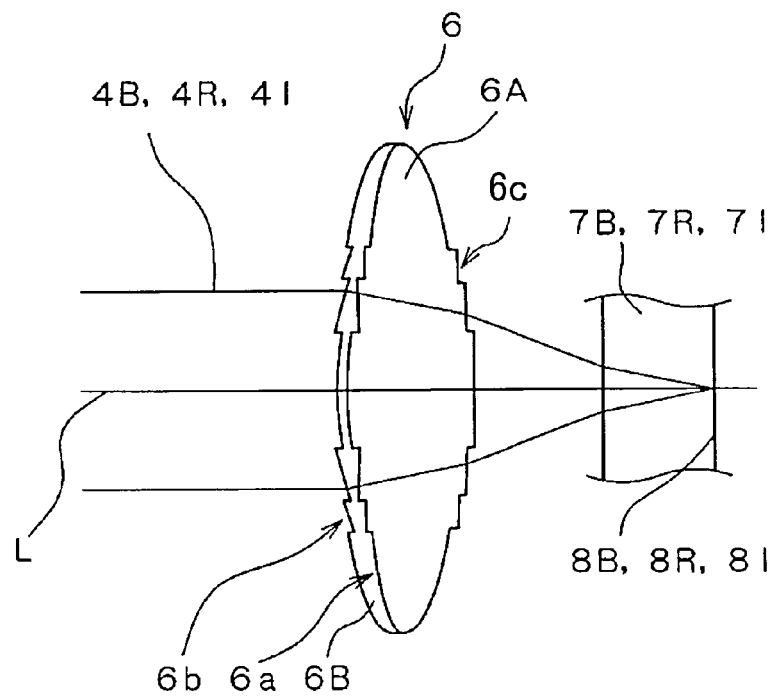
FIG. 13 An essential structural diagram of a fourth embodiment of an optical pickup according to the present invention.

FIG. 13 shows the construction of the present embodiment on the forward path side (i.e., starting from a light source and heading toward the disk surface), past the objective lens 6. In FIG. 13, the objective lens 6 is identical to that of Embodiment 1 with respect to the surface 6b of the transparent layer 6B, the surface 6a of the body 6A, and the like. However, on the opposite face (i.e., the light-outgoing face in the forward path) 6c of the body 6A, a grating having a sawteeth-like cross section is formed so as to be concentric with the optical axis L.

Figure 14:
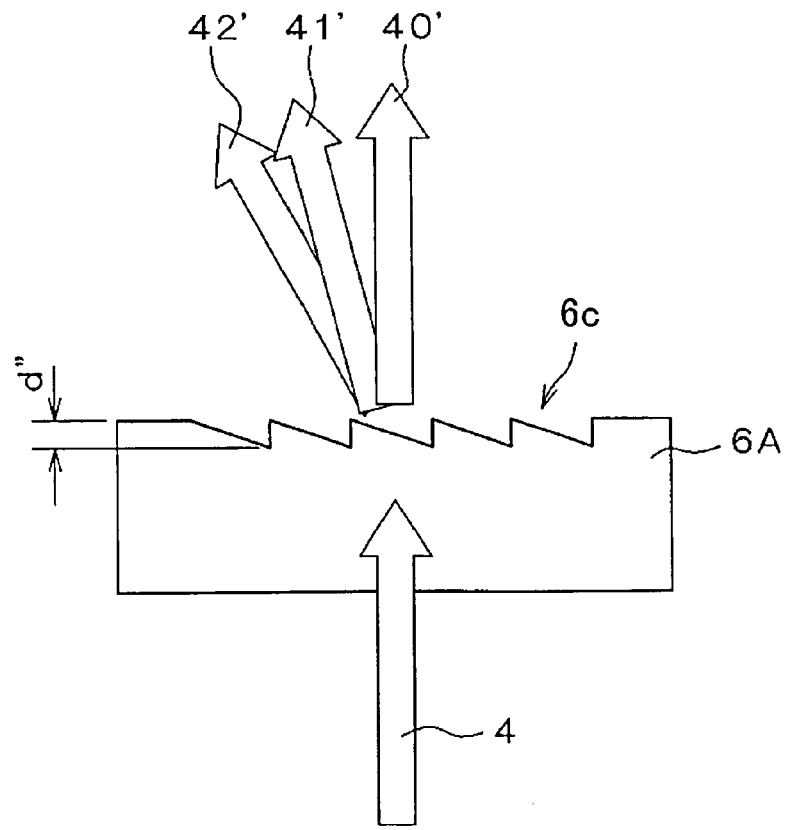
FIG. 14 A diagram for explaining principles of diffraction at a face of an objective lens according to the fourth embodiment.

FIG. 14 is an explanatory diagram for explaining the principles of diffraction at the opposite face 6c of the objective lens 6 in the present embodiment. For simplicity, it is assumed that each face is a plane, and that light perpendicularly enters each face. Because of the grating having the sawteeth-like cross section, incident light 4 produces diffracted waves such as $1^{st}$-order diffracted light 41' and $2^{nd}$-order light 42', in addition to $0^{th}$-order diffracted light 40'. Under the conditions that the body 6A is O-PET (nd=1.62, νd=24) with refractive indices according to (eq. 10), the grating having a step height d"=1.23 µm, the wavelength dependence of diffraction efficiency is as shown in FIG. 15.

Figure 15:
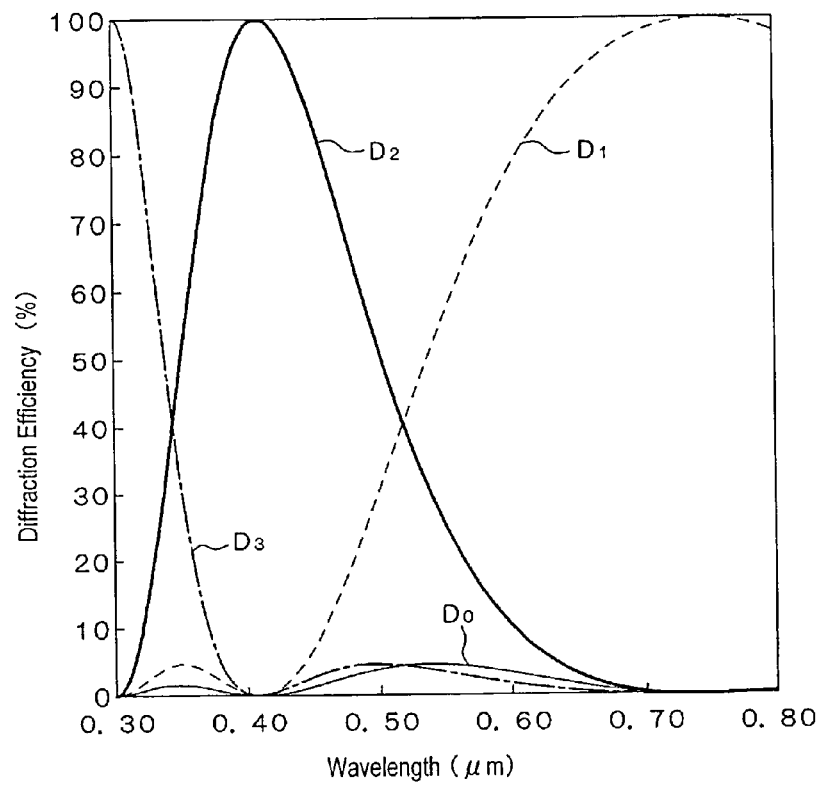
FIG. 15 A diffraction efficiency characteristic diagram according to the fourth embodiment.

In FIG. 15, curve D0 represents the characteristics of $0^{th}$-order diffracted light; curve D1 represents the characteristics of $1^{st}$-order diffracted light; curve D2 represents the characteristics of $2^{nd}$-order light; and curve D3 represents the characteristics of $3^{rd}$-order diffracted light. Curve D2 has a diffraction efficiency of almost 100% at the wavelength of 0.405 µm; curve D1 has diffraction efficiencies of 95% and 98% at the wavelength of 0.660 µm and the wavelength of 0.790 µm, respectively. Therefore, without causing problems such as deterioration of efficiency in other wavelengths of light, the grating on the opposite face 6c can be employed for the correction of a chromatic aberration (Defocus aberration associated with wavelength differences) on blue light. Thus, with a simpler construction than that of Embodiment 3, the same effect (effect of increasing the design freedom) can be obtained.

Embodiment 5

Next, a fifth embodiment of the optical pickup according to the present invention will be described with reference to FIG. 16. The construction of the present embodiment is identical to the construction of Embodiment 4 except for the objective lens 6, and detailed descriptions of the common elements will be omitted.

Figure 16:
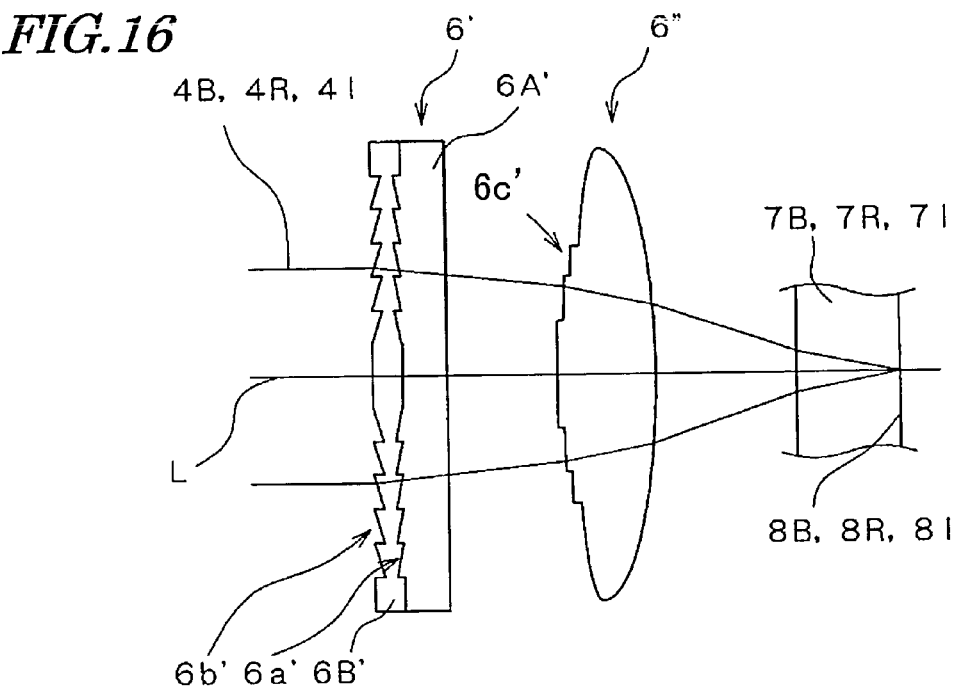
FIG. 16 An essential structural diagram of a fifth embodiment of an optical pickup according to the present invention.

FIG. 16 shows the construction of the present embodiment on the forward path side (i.e., starting from a light source and heading toward the disk surface), before and after the objective lens. The objective lens 6 of Embodiment 4 that is shown in FIG. 13 is, in the present embodiment, split into a diffraction element portion 6' and an objective lens portion 6" as shown in FIG. 16. The diffraction element portion 6' is composed of two types of transparent media (e.g., glass, plastic, or UV-curing resin) having different refractive indices and dispersion characteristics. A body 6A' of the first material has a planar shape, and a grating having a sawteeth-like cross section is formed on a surface 6a' thereof. The grating direction is along a circumference on the surface 6a', around a center axis which is the optical axis L. A transparent layer 6B' of the second material covers the surface 6a' on which the grating is formed. On a surface 6b' (i.e., surface facing the air) thereof, a grating of a shape obtained by inverting the cross section of the aforementioned grating (i.e., a cross-sectional shape obtained by inverting the so-called drawing direction of the sawteeth) is formed, with the edge positions (lower-blade positions) of the sawteeth being aligned. The grating direction is along a circumference around a center axis which is the optical axis L. The first material has a higher refraction and a higher dispersion than those of the second material. Since ν'>ν is satisfied by employing a high-dispersion material as the first material, the diffraction efficiency of the diffraction element portion 6' can exhibit characteristics such that each curve maintains a high diffraction light efficiency over a broad wavelength region, as shown in FIG. 8. On a face 6c' of the objective lens portion 6", a grating having a sawteeth-like cross section is formed so as to be concentric with the optical axis L, thus providing the same action (correction of chromatic aberration) as that of the grating on the face 6c of Embodiment 4. Note that the material composing the objective lens portion 61" preferably has a high-dispersion (e.g. Abbe number of 30 or less) in order to correct the spherical aberration due to base thickness differences and the like.

Light 4B, 4R, and 4I entering the diffraction element portion 6' is diffracted at the surface 6b' of the transparent layer 6B' and the surface 6a' of the body 6A', simultaneously experiences diffraction and refraction at the surface 6c, of the objective lens portion 6", and is refracted at the opposite face (i.e., the light outgoing face in the forward path) of the objective lens portion 61", thus becoming light which is converged on the information layers 8B, 8R, and 8I. In a way, the present embodiment is of a construction in which Embodiment 4 is split into two parts, and the same effect as that of Embodiment 4 is obtained. However, while a complicated grating structure such as the faces 6a and 6b is formed on a non-sphere in Embodiment 4, such a structure can be formed on a plane according to the present embodiment, thus resulting in a significant machining advantage (ease of production). Note that aberration will occur if the diffraction element portion 6' becomes eccentric with respect to the center axis of the objective lens portion 6", and therefore they must be constructed on the same holder so as to maintain coaxialness.

Embodiment 6

Next, a sixth embodiment of the optical pickup according to the present invention will be described with reference to FIG. 17 and FIG. 18. The construction of the present embodiment is identical to the construction of Embodiment 1 except for the objective lens 6.

Figure 17:
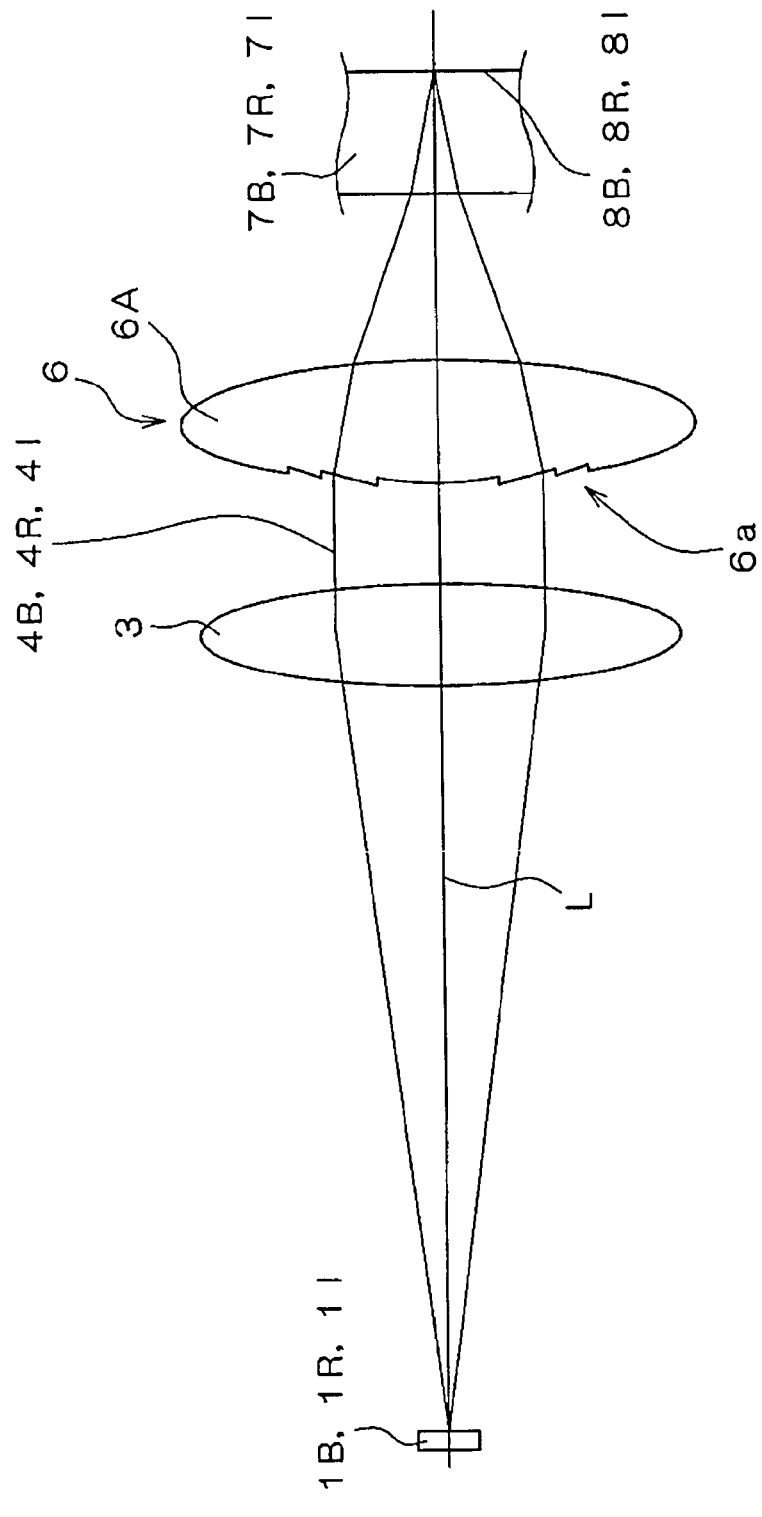
FIG. 17 An essential structural diagram of a sixth embodiment of an optical pickup according to the present invention.

First, FIG. 17 is referred to. FIG. 17 shows a cross-sectional structure of the present embodiment on the forward path side (i.e., starting from a light source and heading toward the disk surface). In the objective lens 6 shown in FIG. 17, a grating having a sawteeth-like cross section is formed on a face 6a of a body 6A so as to be concentric with the optical axis L. FIG. 18 is an explanatory diagram for explaining the principles of diffraction at the face 6a of the objective lens in the present embodiment. For simplicity, it is assumed that each face is a plane, and that light perpendicularly enters each face.

Figure 18:
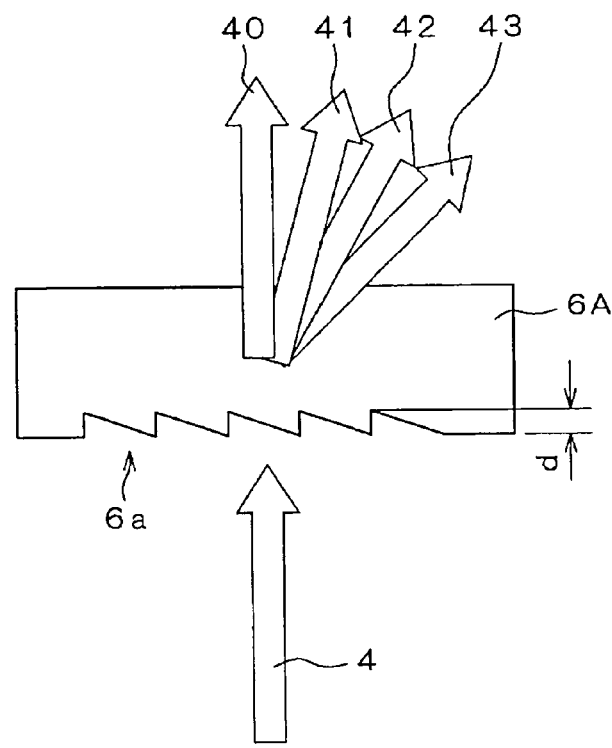
FIG. 18 A diagram for explaining principles of diffraction at an objective lens surface according to the sixth embodiment.

As shown in FIG. 18, because of the grating having the sawteeth-like cross section with a step height d, incident light 4 produces diffracted waves such as $1^{st}$-order diffracted light 41, $2^{nd}$-order light 42, and $3^{rd}$-order diffracted light 43, in addition to $0^{th}$-order diffracted light 40. Under the conditions that the body 6A is formed of a high-dispersion plastic material O-PET (nd=1.62, νd=24) with refractive indices according to (eq. 10), the grating having a step height d=1.85 μm, the wavelength dependence of diffraction efficiency at the face 6a of the objective lens is as shown in FIG. 19.

Figure 19:
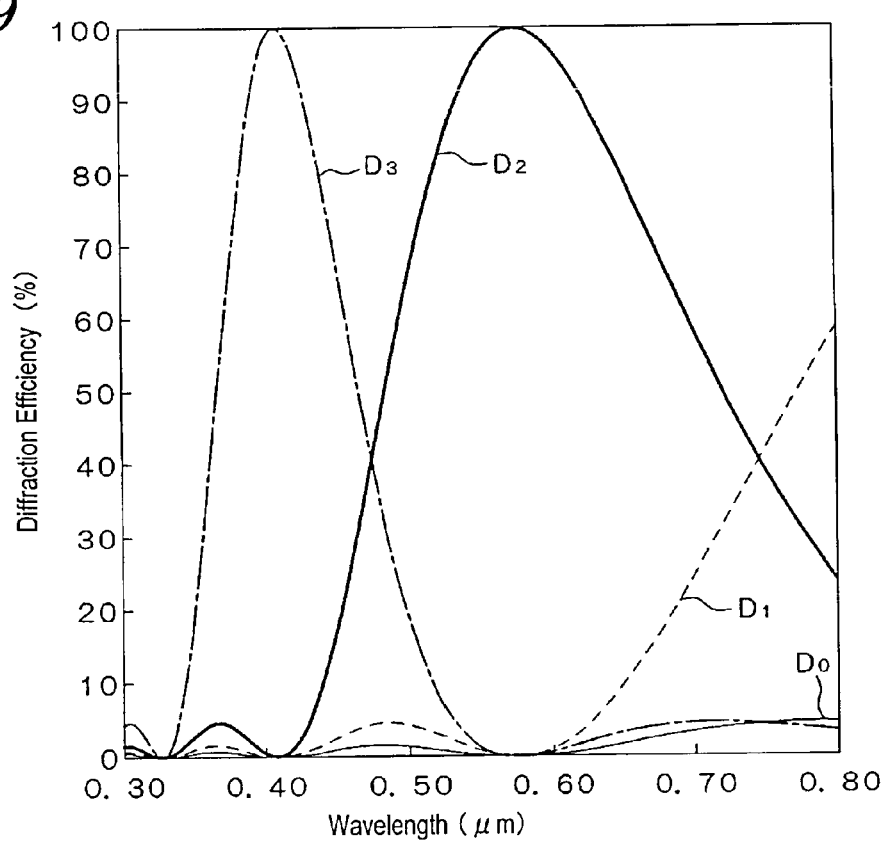
FIG. 19 A diffraction efficiency characteristic diagram according to the sixth embodiment.

In FIG. 19, curve D0 represents the characteristics of $0^{th}$-order diffracted light; curve D1 represents the characteristics of $1^{st}$-order diffracted light; curve D2 represents the characteristics of $2^{nd}$-order light; and curve D3 represents the characteristics of $3^{rd}$-order diffracted light. Curve D3 has a diffraction efficiency of almost 100% at the wavelength of 0.405 μm; and the curve D2 has diffraction efficiencies of 76% and 27% at the wavelength of 0.660 μm and the wavelength of 0.790 μm, respectively.

The aberration correction effect according to the present embodiment consists of an optimum combination which can cancel aberrations associated with base thickness differences and refractive index dispersion, as in Embodiment 1. However, the diffraction efficiencies with respect to the wavelength of 0.660 μm and the wavelength of 0.790 μm are lower than in Embodiment 1. Especially in the case of infrared light, this is not suitable for recording purposes. However, since the grating construction is simpler than in Embodiment 1, this would be adoptable as an inexpensive construction for limited purposes.

Note that, just as Embodiment 4 was split into two parts to construct Embodiment 5, the present embodiment can also be split into a diffraction element portion and an objective lens portion. In this case, the diffraction element portion will have, on one face thereof, a grating with a sawteeth-like cross section which is concentric with the optical axis L, whereas the objective lens portion will have no grating and be formed of a high-dispersion lens material. It will be appreciated that a grating for chromatic aberration correction may be formed on the objective lens portion, and such a grating for chromatic aberration correction may be on another face of the diffraction element portion. Similarly, any construction that combines the above six embodiments may be possible, with their respective effects being combined.

INDUSTRIAL APPLICABILITY

The present invention is suitably used in an optical disk apparatus which accesses multiple types of optical disks with light beams of respectively different wavelengths. Currently, optical disks according to various standards are available, e.g., CDs, DVDs, and BDs, and thus there is a need to perform recording/reproduction for such optical disks with a single optical disk apparatus.

The invention claimed is:

1. An optical pickup comprising: a plurality of light sources for emitting a plurality of light beams including first and second light beams of respectively different wavelengths;
an objective lens for converging the plurality of light beams; and
a grating structure shaped axisymmetrically with respect to an optical axis of the objective lens, wherein,
the objective lens and the grating structure cause $p^{th}$-order diffracted light (where p is a non-zero integer) to be converged on an information layer of an optical disk corresponding to the first light beam, the $p^{th}$-order diffracted light (where p is a non-zero integer) being formed from the first light beam by the grating structure; and the objective lens and the grating structure cause $q^{th}$-order diffracted light (where q is a non-zero integer such that q≠p) to be converged on an information layer of an optical disk corresponding to the second light beam, the $q^{th}$-order diffracted light being formed from the second light beam by the grating structure, wherein, the plurality of beams include a third light beam of a wavelength which is different from the wavelengths of the first and second light beams; and the objective lens and the grating structure cause $r^{th}$-order diffracted light (where r is a non-zero integer such that r≠p) to be converged on an information layer of an optical disk corresponding to the third light beam, the $r^{th}$-order diffracted light being formed from the third light beam by the grating structure.

2. The optical pickup of claim 1, wherein,
the first light beam has a blue wavelength and the second light beam has a red or infrared wavelength; and
p=3 and q=2.

3. The optical pickup of claim 1, wherein the first, second, and third light beams have blue, red, and infrared wavelengths, respectively, where p=3 and q=r=2.

4. The optical pickup of claim 3, wherein optical disks corresponding to the first, second, and third light beam are a BD, a DVD, and a CD, respectively.

5. The optical pickup of claim 1, wherein the grating structure is formed on a surface of the objective lens.

6. The optical pickup of claim 1, wherein the grating structure is formed on a parallel-surface plate.

7. The optical pickup of claim 4, wherein the objective lens is formed of an optical material having an Abbe number of 30 or less.

8. The optical pickup of claim 1, wherein the grating structure has a sawtooth blazed surface.

9. The optical pickup of claim 1, wherein,
the grating structure includes:
a first light transmitting layer having a first sawtooth blazed surface, the first sawtooth blazed surface including a plurality of first light-transmitting slopes defining a first blaze angle; and
a second light transmitting layer having a second sawtooth blazed surface, the second sawtooth blazed surface including a plurality of second light-transmitting slopes defining a second blaze angle, the second light transmitting layer being in contact with the first sawtooth blazed surface of the first light transmitting layer, and
a tilting direction of the first light-transmitting slopes and a tilting direction of the second light-transmitting slopes are opposite.

10. The optical pickup of claim 9, wherein,
one of the first light transmitting layer and the second light transmitting layer is composed of the objective lens; and
the other of the first light transmitting layer and the second light transmitting layer is formed on the objective lens.

11. The optical pickup of claim 10, wherein,
a refractive index and a dispersion of one of the first light transmitting layer and the second light transmitting layer are higher than a refractive index and a dispersion of the other; and the objective lens is composed of a light transmitting layer whose refractive index and dispersion are higher between the first light transmitting layer and second light transmitting layer.

12. The optical pickup of claim 3, wherein a deviation of a focal length of the objective lens for an optical disk corresponding to each of the plurality of light sources is 1/50 or less of an average focal length.

13. The optical pickup according to claim 1, further comprising a second grating structure, wherein,
the second grating structure form $p'^{th}$-order diffracted light, $q'^{th}$-order diffracted light, and $r'^{th}$-order diffracted light (where p', q', and r'are non-zero integers which are not a single integer) from the first, second, and third light beams, respectively, each diffracted light being converged by the objective lens and the grating structure on an information surface of an optical disk corresponding to each light beam.

14. The optical pickup of claim 13, wherein the first, second, and third light beams have blue, red, and infrared wavelengths, respectively, where p'=2 and q'=r'=1.

15. An optical disk apparatus supporting a plurality of types of optical disks for which data reproduction is performed with a plurality of light beams including first and second light beams of respectively different wavelengths, the optical disk apparatus comprising:
a motor for rotating an optical disk; and
an optical pickup for accessing the optical disk,
the optical pickup including:
a plurality of light sources for emitting the plurality of light beams;
an objective lens for converging the plurality of light beams; and
a grating structure shaped axisymmetrically with respect to an optical axis of the objective lens, wherein,
the objective lens and the grating structure cause $p^{th}$-order diffracted light (where p is a non-zero integer) to be converged on an information layer of an optical disk corresponding to the first light beam, the $p^{th}$-order diffracted light (where p is a non-zero integer) being formed from the first light beam by the grating structure; and the objective lens and the grating structure cause $q^{th}$-order diffracted light (where q is a non-zero integer such that q≠p) to be converged on an information layer of an optical disk corresponding to the second light beam, the $q^{th}$-order diffracted light being formed from the second light beam by the grating structure, wherein, the plurality of beams include a third light beam of a wavelength which is different from the wavelengths of the first and second light beams; and the objective lens and the grating structure cause $r^{th}$-order diffracted light (where r is a non-zero integer such that r≠p) to be converged on an information layer of an optical disk corresponding to the third light beam, the $r^{th}$-order diffracted light being formed from the third light beam by the grating structure.

* * * * *